(12) United States Patent
Koseki et al.

(10) Patent No.: US 10,363,957 B2
(45) Date of Patent: Jul. 30, 2019

(54) DEVICE AND METHOD FOR CONTROLLING ELECTRIC MOTOR

(71) Applicant: Hitachi Automotive Systems, Ltd., Hitachinaka-shi, Ibaraki (JP)

(72) Inventors: Tomonobu Koseki, Isesaki (JP); Tomishige Yatsugi, Isesaki (JP); Fumiya Iijima, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/510,382

(22) PCT Filed: Sep. 9, 2015

(86) PCT No.: PCT/JP2015/075570
§ 371 (c)(1),
(2) Date: Mar. 10, 2017

(87) PCT Pub. No.: WO2016/039368
PCT Pub. Date: Mar. 17, 2016

(65) Prior Publication Data
US 2017/0259846 A1   Sep. 14, 2017

(30) Foreign Application Priority Data

Sep. 11, 2014   (JP) ................. 2014-185540

(51) Int. Cl.
*B62D 5/04*   (2006.01)
*B62D 6/00*   (2006.01)
(Continued)

(52) U.S. Cl.
CPC ......... *B62D 5/0481* (2013.01); *B62D 5/0463* (2013.01); *B62D 6/001* (2013.01);
(Continued)

(58) Field of Classification Search
CPC .... B62D 5/0481; B62D 5/0463; B62D 6/001; H02P 27/08; H02P 29/0243; H02P 29/028; H02P 29/68
(Continued)

(56) References Cited

U.S. PATENT DOCUMENTS

| | | | | |
|---|---|---|---|---|
| 2011/0156627 A1* | 6/2011 | Nakamura | ........... | B62D 5/0403 318/400.22 |
| 2011/0315470 A1* | 12/2011 | Uryu | .................... | B62D 5/0484 180/446 |
| 2015/0314804 A1* | 11/2015 | Aoki | .................... | B62D 5/0484 701/43 |

FOREIGN PATENT DOCUMENTS

| | | | |
|---|---|---|---|
| JP | 2005-59795 A | | 3/2005 |
| JP | 2005059795 A | * | 3/2005 |

(Continued)

OTHER PUBLICATIONS

International Preliminary Report on Patentability (PCT/IB/338 & PCT/IB/373) issued in PCT Application No. PCT/JP2015/075570 dated Mar. 23, 2017, including English translation of document C2 (Japanese-language Written Opinion (PCT/ISA/237)) previously filed on Mar. 10, 2017 (fourteen (14) pages).

(Continued)

*Primary Examiner* — Kawing Chan
*Assistant Examiner* — Bradley R Brown
(74) *Attorney, Agent, or Firm* — Crowell & Moring LLP

(57) ABSTRACT

Provided is a control device for an electric motor which includes multiple energization systems each including an inverter and coils corresponding to different phases, and which generates a steering assist force in an electric power steering system. Control device diagnoses whether any of inverters 1A and 1B fails, and, when either of the inverters is diagnosed as having failed, reduces the output ratio of the failing inverter to 0% while increasing the output ratio of the (Continued)

normally operating inverter to 100% so as to prevent a drop in the total output from all the inverters after the failure-positive diagnosis. If steering operation is performed after the failure-positive diagnosis, control device performs overheat protection processing for gradually lowering the limit value for the total output from all the inverters in accordance with the sensed temperature of the normally operating inverter.

15 Claims, 12 Drawing Sheets

(51) Int. Cl.
*H02P 29/028* (2016.01)
*H02P 29/68* (2016.01)
*H02P 27/08* (2006.01)
*H02P 29/024* (2016.01)

(52) U.S. Cl.
CPC ............ *H02P 27/08* (2013.01); *H02P 29/028* (2013.01); *H02P 29/0243* (2016.02); *H02P 29/68* (2016.02)

(58) Field of Classification Search
USPC .......................................................... 318/453
See application file for complete search history.

(56) References Cited

FOREIGN PATENT DOCUMENTS

| JP | 2006-44437 A | | 2/2006 |
|---|---|---|---|
| JP | 2006044437 A | * | 2/2006 |
| JP | 2007-30678 A | | 2/2007 |
| JP | 2012-111474 A | | 6/2012 |
| WO | WO 2014/115275 A1 | | 7/2014 |

OTHER PUBLICATIONS

International Search Report (PCT/ISA/210) issued in PCT Application No. PCT/JP2015/075570 dated Dec. 1, 2015 with English translation (four (4) pages).

Written Opinion (PCT/ISA/237) issued in PCT Application No. PCT/JP2015/075570 dated Dec. 1, 2015 (five (5) pages).

Japanese-language Office Action issued in counterpart Japanese Application No. 2014-185540 dated Dec. 5, 2017 with English translation (Seven (7) pages).

* cited by examiner

DEVICE AND METHOD FOR CONTROLLING ELECTRIC MOTOR

TECHNICAL FIELD

The present invention relates to a device and method for controlling an electric motor that includes a plurality of energization systems each including an inverter and coils corresponding to different phases.

BACKGROUND ART

In a conventionally known device and method for controlling an electric motor that includes a plurality of energization systems each including an inverter and coils corresponding to different phases, two inverters may be used to supply a current to a single electric motor which generates a steering assist three in a vehicle electric power steering system, as illustrated in Patent Document 1, for example.

In such a control device and method, when one of the inverters fails, the output of the failing inverter to the electric motor is force-stopped while the other inverter, which is normally operating, is caused to provide an output whose amount is equal to that normally provided by the two inverters so as to prevent the total output from all the inverters from dropping and thus to prevent the required steering force from abruptly increasing. A conceivable measure to make this possible is to approximately double the tolerance of each inverter, which, however, leads to an increase in production costs.

Thus, in the device and method for controlling an electric motor disclosed in Patent Document 1, when one of the inverters fails and the output of the failing inverter is force-stopped, the output of the other inverter, which is normally operating, is controlled as follows. Specifically, at first, the normally operating inverter is caused to supply the electric motor with a current twice as large as the current the inverter supplies when both the inverters operate normally, and, after a predetermined time passes, the current that the normally operating inverter supplies to the electric motor is gradually reduced from the viewpoint of overheat protection.

REFERENCE DOCUMENT LIST

Patent Document

Patent Document 1 JP 2012-411474 A

SUMMARY OF THE INVENTION

Problems to be Solved by the Invention

When the driver does not continuously perform steering operation throughout before and after the occurrence of a failure, such as when the driver temporally stops steering operation before the failure occurrence, and resumes steering operation after the predetermined time described above or more passes from the failure occurrence, the following problem occurs. In such case, the other inverter, which operates normally, supplies a current smaller than twice the current that the inverter supplies when both of the inverters operate normally, and thus cannot sufficiently compensate for the loss of the current that has been supplied by the failing inverter. As a result, the required steering force increases abruptly compared to that before the failure occurrence, and affects the controllability of the vehicle. This may possibly reduce the travel safety of the vehicle.

The present invention has been made in view of the above problems, and has an object to provide, in an electric power steering system in which an electric motor is driven by a current supplied from a plurality of inverters so as to generate a steering assist force, a control device and method for the electric motor which allows curbing an abrupt increase in the required steering force after the occurrence of a failure in one or more of inverters even when the driver does not continuously perform steering operation throughout before and after one or some of the inverters fail.

Means for Solving the Problems

To this end, according to the present invention, in the device and method for controlling an electric motor which includes a plurality of energization systems each including an inverter and coils corresponding to different phases, and which generates a steering assist force in an electric power steering system, it is diagnosed whether the inverter in any of the energization systems fails, and, when the inverters in one or some of the energization systems is diagnosed as having failed, an output ratio of each of the failing inverters, which are diagnosed as having failed, is reduced while an output ratio of a normally operating inverter, which is diagnosed as having not failed, is increased so as to prevent a drop in a total output from all the inverters after the diagnosis of failing is made. Then, if steering operation is performed after the diagnosis of failing is made, a limit value for the total output from all the inverters is gradually lowered. Here, the state where an inverter in any of the energization systems fails may include the state where a control unit for controlling the output of the inverter fails.

Effects of the Invention

In an electric power steering system in which an electric motor is driven by a current supplied from a plurality of inverters so as to generate a steering assist force, the control device and method for the electric motor according to the present invention makes it possible to curb an abrupt increase in a required steering force after the failure occurrence even if the driver does not continuously perform steering operation throughout before and after one or some of the inverters fail.

BRIEF DESCRIPTION OF THE DRAWINGS

FIG. 8B is for the second inverter.

MODE FOR CARRYING OUT THE INVENTION

Hereinafter, a detailed description will be given of an embodiment of the present invention with reference to the accompanying drawings.

Figure 1:
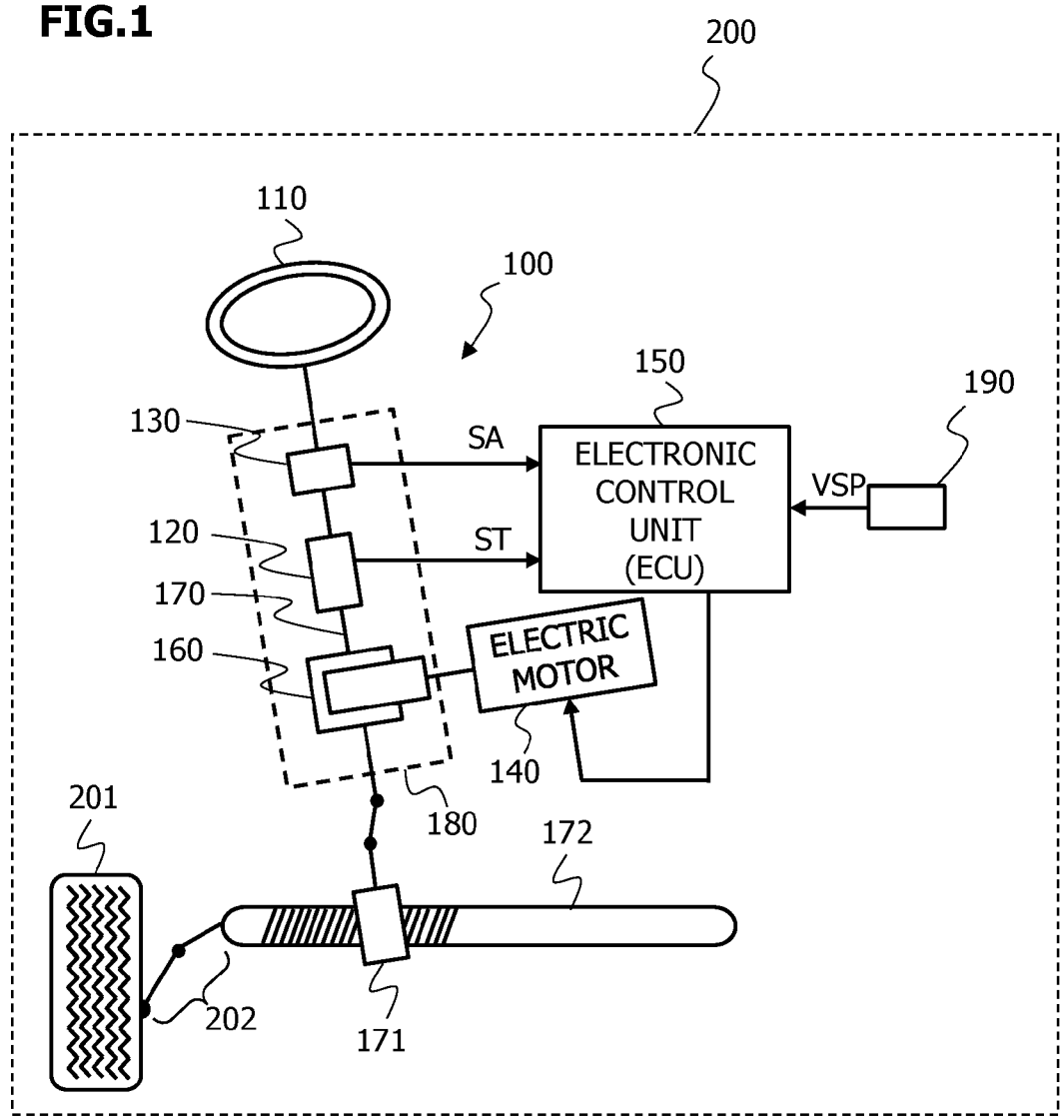
FIG. 1 is a schematic configuration diagram of an electric power steering system to which a device and method for controlling an electric motor according to an embodiment of the present invention is applied.

FIG. 1 illustrates an embodiment of a device and method for controlling an electric motor according to the present invention. Specifically, FIG. 1 illustrates, as an example, an electric motor which generates a steering assist force in a vehicle electric power steering system to which the embodiment is applied.

An electric power steering system 100 illustrated in FIG. 1, which is provided in a vehicle 200, causes an electric motor 140 to generate a steering assist force.

Electric power steering system 100 includes a steering wheel 110, a steering torque sensor 120, a steering angle sensor 130, electric motor 140, an electronic control unit (ECU) 150 including inverters, and a reducer 160. Reducer 160 transmits a rotation obtained by reducing the rotation of electric motor 140 to a steering shaft 170 (pinion shaft).

Steering torque sensor 120, steering angle sensor 130, and reducer 160 are provided in a steering column 180, which incorporates a steering shaft 170.

A pinion gear 171 is provided to an end of steering shaft 170. When pinion gear 171 rotates, a rack gear 172 moves horizontally and sideways with respect to the travel direction of vehicle 200. To each of the opposite ends of rack gear 172, a steering mechanism 202 for a wheel 201 is provided. As rack gear 172 moves horizontally, wheel 201 changes its orientation.

Steering torque sensor 120 senses a steering torque of steering shaft 170 generated when the driver of vehicle 200 performs steering operation, and outputs, to electronic control unit 150, a signal ST indicating the sensed steering torque.

Steering angle sensor 130 senses, as a steering angle, the rotation angle of steering shaft 170 generated when the driver of vehicle 200 performs steering operation to rotate steering wheel 110, and outputs a signal SA indicating the sensed steering angle to electronic control unit 150.

Electronic control unit 150, which includes a microcomputer (processor), receives condition variables for determining the steering assist force such as the steering torque signal ST and the steering angle signal SA, a vehicle speed signal VSP outputted by a vehicle speed sensor 190.

Based on driving conditions of vehicle 200 such as the steering torque signal ST, the steering angle signal SA, and the vehicle speed signal VSP, electronic control unit 150 controls electric motor 140, and thereby controls the steering assist force based on a torque generated by electric motor 140. In the example illustrated in FIG. 1, electronic control unit 150 including the inverters controls electric motor 140. However, the inverters, which serve as drive circuits, may alternatively be provided as a separate unit or separate units from electronic control unit 150. In this case, the control device for an electric motor includes all the components of electronic control unit 150 except for the inverters.

Figure 2A:
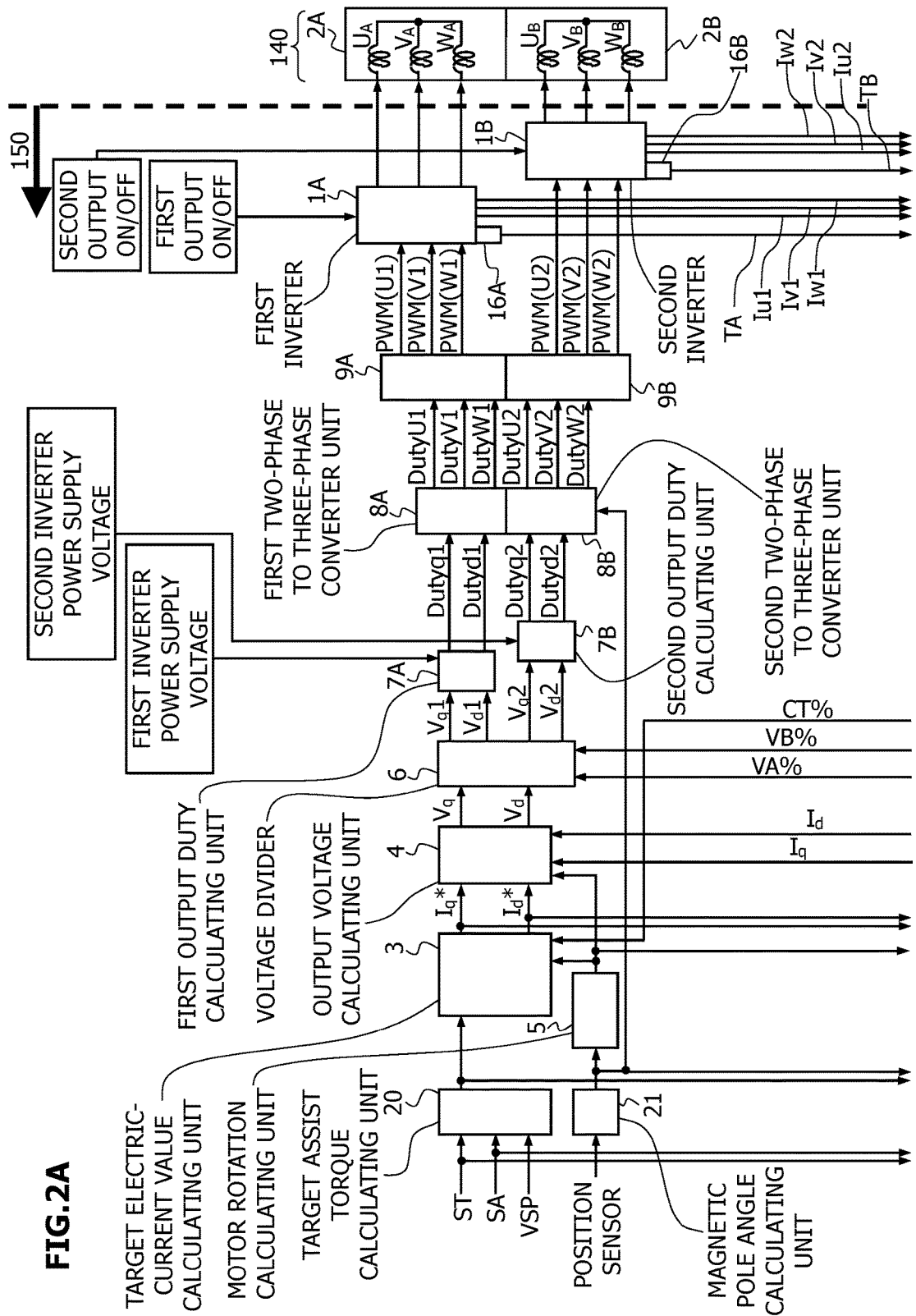
FIGS. 2A and 2B are functional block diagrams of the control device for an electric motor according to the embodiment of the present invention.
Figure 2B:
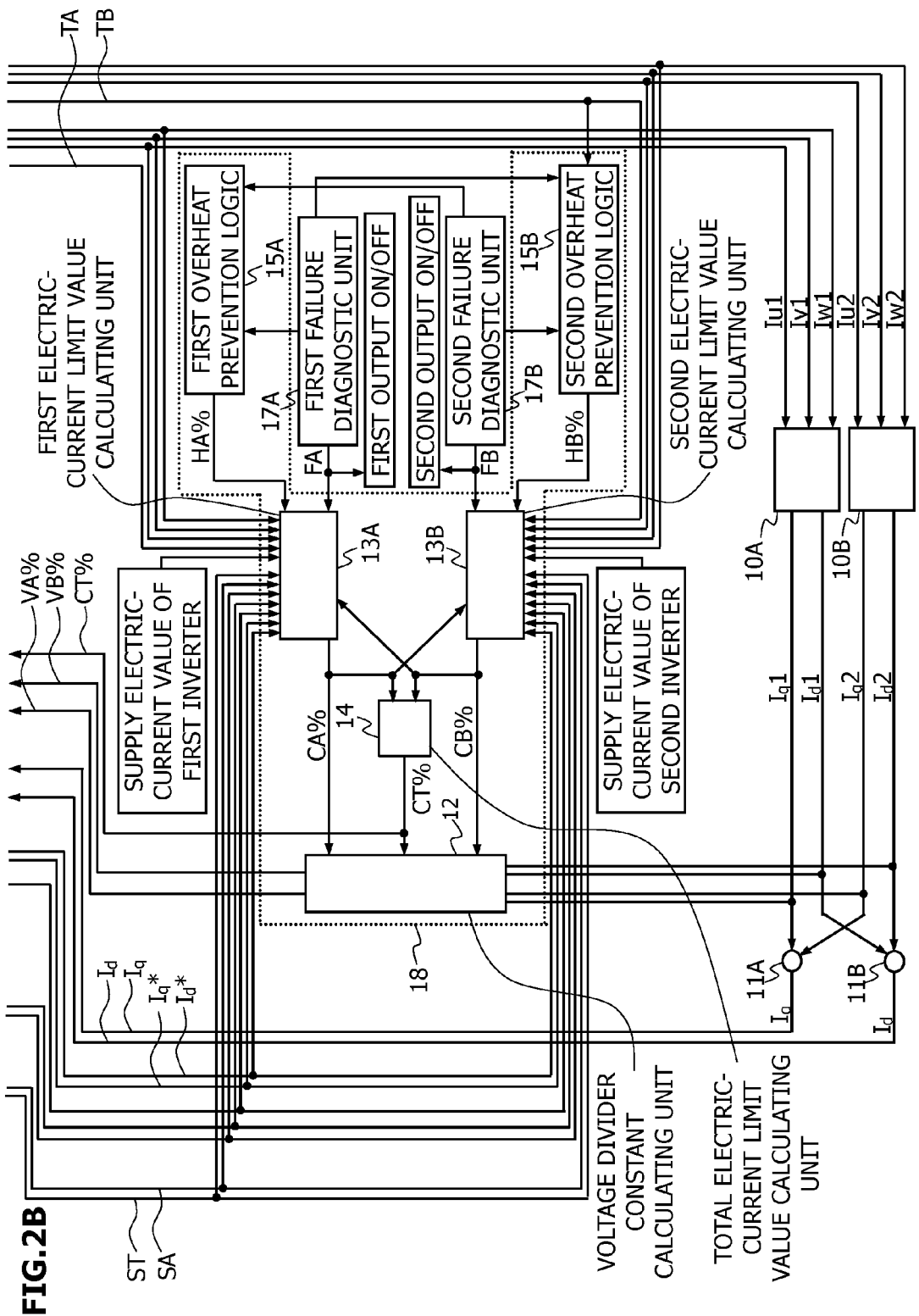

FIG. 2 is a functional block diagram illustrating an example of a control function of electronic control unit (ECU) 150. Note that, though an electric motor including two energization systems each including an inverter and three-phase coils will be used as an example in the following description for illustrative purposes, the device and method for controlling an electric motor according to the present invention are applicable to any electric motor that includes a plurality of energization systems each including an inverter and coils corresponding to different phases.

In FIG. 2, electronic control unit 150 includes a first inverter 1A and a second inverter 1B which have the same configuration as each other, and causes both first inverter 1A and second inverter 113 to supply power to single electric motor 140.

Electric motor 140 is a three-phase synchronous electric motor having a first coil. set 2A and a second coil set 2B. First coil set 2A is formed of star connected three-phase coils $U_A$, $V_A$, and $W_A$, and second coil set 2B is formed of star connected three-phase coils $U_B$, $V_B$, and $W_B$. First coil set 2A and second coil set 2B share a magnetic circuit of electric motor 140.

First coil set 2A (three-phase coils $U_A$, $V_A$, and $W_A$) is connected directly to first inverter 1A while second coil set 2B (three-phase coils $U_B$, $V_B$, and $W_B$) is connected directly to second inverter 1B, so that first inverter 1A supplies power to first coil set 2A while second inverter 1B supplies power to second coil set 2B.

First inverter 1A and second inverter 1B, each of which is a three-phase output inverter using two switching elements per phase, convert direct current power into three-phase alternating current power, and output the three-phase alternating current power to first coil set first coil set 2A and second coil set 2B, respectively.

First inverter 1A has a first temperature sensor (temperature sensing device) 16A for sensing a temperature TA related to first inverter 1A and outputs a signal indicating the temperature TA. Second inverter 1B has a second temperature sensor (temperature sensing device) 16B for sensing a temperature TB related to second inverter 1B and outputs a signal indicating the temperature TB. First temperature sensor 16A is provided in the interior or vicinity of first inverter 1A, such as on the substrate of first inverter 1A. Similarly, second temperature sensor 16B is provided in the interior or vicinity of second inverter 1B.

Note, however, that, when first inverter 1A and second inverter 1B are located dose to each other, first inverter 1A and second inverter 1B may share a single temperature sensor for sensing both of the temperature TA related to first inverter 1A and the temperature TB related to second inverter 1B.

First inverter 1A incorporates a first output electric-current sensing device (not illustrated) for sensing output electric-current values flowing respectively through coils $U_A$, $V_A$, and $W_A$ of first coil set 2A. Second inverter 1B incorporates a second output electric-current sensing device (not illustrated) for sensing output electric-current values flowing through coils $U_B$, $V_B$, and $W_B$ of second coil set 2B, respectively. In addition, first inverter 1A incorporates a first supply electric-current sensing device (not illustrated) for sensing the value of a supply electric current (input current) supplied by an in-vehicle power supply. Similarly, second inverter 1B incorporates a second supply electric-current sensing device (not illustrated) for sensing the value of a supply electric current supplied by the in-vehicle power supply.

Based on sensing results such as a steering force (steering torque indicated by the steering torque signal ST) that the driver, applies on steering wheel 110 in FIG. 1, a vehicle speed indicated by the vehicle speed signal VSP, a steering angle indicated by the steering angle signal SA, a target assist torque calculating unit 20 calculates a target assist torque (target value for the output torque of electric motor 140).

A magnetic pole angle calculating unit 21 receives a signal outputted by a magnetic pole position sensor (not illustrated) for sensing a magnetic pole angle of a permanent magnet fixed to a rotor (not illustrated) of electric motor 140, and calculates a magnetic pole angle (magnetic pole position) from the signal. Based on the magnetic pole angle, a motor rotation calculating unit 5 calculates the rotation speed of electric motor 140, and transmits a signal indicating the rotation speed to a target electric-current value calculating unit 3 and an output voltage calculating unit 4.

Based on data on the target assist torque and the rotation speed of electric motor 140, target electric-current value calculating unit 3 calculates a d-axis electric-current command value $I_d^*$ and a q-axis electric-current command value $I_q^*$.

Output voltage calculating unit 4 performs feedback control based on the d-axis electric-current command value $I_d^*$ and the q-axis electric-current command value $I_q^*$ calculated by target electric-current value calculating unit 3, as well as on a d-axis actual electric-current value $I_d$ and a q-axis actual electric-current value $I_q$ based on the sensing results outputted by both of the first output electric-current sensing device incorporated in first inverter 1A and the second output electric-current sensing device incorporated in second inverter 1B. In other words, output voltage calculating unit 4 calculates the d-axis voltage command value $V_d$ and the q-axis voltage command value $V_q$ so as to bring the d-axis actual electric-current value $I_d$ closer to d-axis electric-current command value $I_d^*$, and bring the q-axis actual electric-current value $I_q$ closer to q-axis electric-current command value $I_q^*$.

Specifically, output voltage calculating unit 4 calculates the d-axis voltage command value $V_d$ and the q-axis voltage command value $V_q$ by using a motor model formula for vector control so as to bring a difference between the d-axis actual electric-current value and the d-axis electric-current command value $I_d^*$ closer to zero and to bring a difference between the q-axis actual electric-current value $I_q$ and the q-axis electric-current command value $I_q^*$ closer to zero.

The d-axis voltage command value $V_d$ and the q-axis voltage command value $V_q$ calculated by output voltage calculating unit 4 are used by a voltage divider 26.

Based on the d-axis voltage command value $V_d$, the q-axis voltage command value $V_q$, a first voltage divider constant VA % (output ratio of first inverter 1A), and a second voltage divider constant VB % (output ratio of second inverter 1B), voltage divider 6 calculates a d-axis voltage command value $V_d1$ and a q-axis voltage command value $V_q1$ for first coil set 2A (first inverter 1A), and a d-axis voltage command value $V_d2$ and a q-axis voltage command value $V_q2$ for second coil set 2B (second inverter 1B). Specifically, based on the d-axis voltage command value $V_d$, the q-axis voltage command value $V_q$, and the first voltage divider constant VA %, voltage divider 6 calculates the d-axis voltage command value $V_d1$ and the q-axis voltage command value $V_q1$. Based on the d-axis voltage command value $V_d$, the q-axis voltage command value $V_q$, and the second voltage divider constant VB %, voltage divider 6 calculates the d-axis voltage command value $V_d2$ and the q-axis voltage command value $V_q2$.

The sum of the first voltage divider constant VA % and the second voltage divider constant VB % is 100%. When the first voltage divider constant VA %=the second voltage divider constant VB %=50% is true, both of the d-axis voltage command value $V_d1$=the d-axis voltage command value $V_d2$, and the q-axis voltage command value $V_q1$=the q-axis voltage command value $V_q2$ hold, that is, the output ratio between first inverter 1A and second inverter 1B is 50%:50%.

The d-axis voltage command value $V_d1$ and the q-axis voltage command value $V_q1$ calculated by voltage divider 6 are used by first output duty calculating unit 7A. The d-axis voltage command value $V_d2$ and the q-axis voltage command value $V_q2$ calculated by voltage divider 6 are used by second output duty calculating unit 7B.

Based on the d-axis voltage command value $V_d1$, the q-axis voltage command value $V_q1$, and the power supply voltage of first inverter 1A, first output duty calculating unit 7A calculates a d-axis duty Dutyd1 and a q-axis duty Dutyq1 in pulse width modulation (PWM) control of first inverter 1A.

Based on the d-axis voltage command value V the q-axis voltage command value $V_q2$, and the power supply voltage of second inverter 1B, second output duty calculating unit 7B calculates a d-axis duty Dutyd2 and a q-axis duty Dutyq2 in PWM control of second inverter 1B.

The d-axis duty Dutyd1 and the q-axis duty Dutyq1 calculated by first output duty calculating unit 7A, and the magnetic pole angle of electric motor 140 are used by a first two-phase to three-phase converter unit 8A. Based on the information, first two-phase to three-phase converter unit 8A calculates the duty command values DutyU1, DutyV1, and DutyW1 respectively for the three phases of first coil set 2A.

The d-axis duty Dutyd2 and the q-axis duty Dutyq2 calculated by second output duty calculating unit 7B, and the magnetic pole angle of electric motor 140 are used by a second two-phase to three-phase converter unit 8B. Based on the information, second two-phase to three-phase converter unit 8B calculates the duty command values DutyU2, DutyV2, and DutyW2 respectively for the three phases of second coil set 2B.

The output ratio between first inverter 1A and second inverter 1B can be changed by correcting the duty command values calculated by two-phase to three-phase converter units 8A and 8B. However, in the configuration illustrated in FIG. 2, the output ratio is changed by correcting the signals before inputting the signals to two-phase to three-phase converter units 8A and 8B. Such a configuration allows for highly accurate control of the output ratio even when the coils in electric motor 140 have different phases from one another.

The duty command values DutyU1, DutyV1, and DutyW1 calculated by first two-phase to three-phase converter unit 8A are used by a first dead-time compensation unit 9A. First dead-time compensation unit 9A calculates the duty command values DutyU1, DutyV1, and DutyW1 subjected to dead-time compensation, and generates PWM signals PWM(U1), PWM(V1), and PWM(W1) respectively for different phases.

The duty command values DutyU2, DutyV2, and DutyW2 calculated by second two-phase to three-phase converter unit 8B are used by a second dead-time compensation unit 9B. Second dead-time compensation unit 9B calculates the duty command values DutyU2, DutyV2, and DutyW2 subjected to dead-time compensation, and generates PWM(U2), PWM(V2), and PWM(W2) as PWM signals respectively for different phases.

The dead-time compensation indicates processing for preventing or reducing a voltage drop and the like due to a dead-time voltage during PWM control that generates, as a gate signal, the PWM signal whose rising is delayed by a dead-time period in order to prevent a short circuit between upper and lower arms in inverters 1A and 1B. Here, the rising of the PWM signal depends on the comparison result, for example, between a triangle wave and a duty command value.

The duty command values DutyU1, DutyV1, and DutyW1 on which dead-time compensation is performed by first dead-time compensation unit 9A are converted into the PWM signals PWM(U1), PWM(V1), and PWM(W1) respectively for different phases of first inverter 1A. Based on PWM(U1), PWM(V1), and PWM(W1), gate signals respectively for switching elements of different phases are generated and outputted. In first inverter 1A, each of the switching elements of different phases is driven by receiving the corresponding gate signal. Thereby, the output electric currents flowing through coils $U_A$, $V_A$, and $W_A$ of first coil set 2A are controlled by PWM control.

The duty command values DutyU2, DutyV2, and DutyW2 on which dead-time compensation is performed by second dead-time compensation unit 9B are converted into the PWM signals PWM(U2), PWM(V2) and PWM(W2) respectively for different phases of second inverter 1B. Based on PWM(U2), PWM(V2), and PWM(W2), gate signals respectively for switching elements of different phases are generated and outputted. In second inverter 1B, each of the switching elements of different phases is driven by receiving the corresponding gate signal. Thereby, the output electric currents flowing through coils $U_B$, $V_B$, and $W_B$ of second coil set 2B are controlled by PWM control.

The output electric currents iu1, iv1, and iw1 flowing respectively through coils $U_A$, $V_A$, and $W_A$ of first coil set 2A are sensed by the first output electric-current sensing device incorporated in first inverter 1A as described above, and the sensing results are outputted to a first three-phase to two-phase converter unit 10A. First three-phase to two-phase converter unit 10A converts the output electric currents iu1, iv1, and iw1 into a d-axis actual electric-current value $I_d1$ and a q-axis actual electric-current value $I_q I$.

The output electric currents iu2, iv2, and iw2 flowing respectively through coils $U_B$, $V_B$, and $W_B$ of second coil set 2B are sensed by the second output electric-current sensing device incorporated in second inverter 1B as described above, and the sensing results are outputted to a second three-phase to two-phase converter unit 10B. Second three-phase to two-phase converter unit 10B converts the output electric currents iu2, iv2, and iw2 into a d-axis actual electric-current value $I_d2$ and a q-axis actual electric-current value $I_q2$.

A first adder 11A adds the d-axis actual electric-current value $I_d1$ calculated by first three-phase to two-phase converter unit 10A to the d-axis actual electric-current value $I_d2$ calculated by second three-phase to two-phase converter unit 10B. The result of addition is used by output voltage calculating unit 4 as the d-axis actual electric-current value $I_d$ in electric motor 140.

A second adder 11B adds the q-axis actual electric-current value $I_q1$ calculated by first three-phase to two-phase converter unit 10A to the q-axis actual electric-current value $I_q2$ calculated by second thee-phase to two-phase converter unit 10B. The result of addition is used by output voltage calculating unit 4 as the q-axis actual electric-current value $I_q$ in electric motor 140.

Voltage divider constant calculating unit 12 uses the d-axis actual electric-current value $I_d1$ and the q-axis actual electric-current value $I_q1$ calculated by first three-phase to two-phase converter unit 10A, the d-axis actual electric-current value $I_d2$ and the q-axis actual electric-current value $I_q2$ calculated by second three-phase to two-phase converter unit 10B, a first electric-current limit value CA % calculated by a first electric-current limit value calculating unit 13A, a second electric-current limit value CB % calculated by a second electric-current limit value calculating unit 13B, and a total electric-current limit value CT % calculated by total electric-current limit value calculating unit 14.

Based on input signals indicating the d-axis actual electric-current value $I_d1$, the q-axis actual electric-current value $I_q1$, the d-axis actual electric-current value $I_d2$, the q-axis actual electric-current value $I_q2$, the first electric-current limit value CA %, the second electric-current limit value CB %, and the total electric-current limit value CT %, voltage divider constant calculating unit 12 calculates a first voltage divider constant (command value of the output ratio of first inverter 1A) VA % defining the output ratio of first inverter 1A, and a second voltage divider constant (command value of the output ratio of second inverter 1B) VB % defining the output ratio of second inverter 1B.

First electric-current limit value calculating unit 13A uses a first electric-current limit value HA % for overheat protection set by a first overheat prevention logic unit 15A, a first diagnostic result flag FA set by a first failure diagnostic unit 17A, the supply electric-current value of first inverter 1A sensed by the aforementioned first supply electric-current sensing device, the temperature TA related to first inverter 1A outputted by first temperature sensor 16A, the values of the output electric currents iu1, iv1 and iw1 sensed by the aforementioned first output electric-current sensing device.

Second electric-current limit value calculating unit 13B uses a second electric-current limit value HB % for overheat protection set by a second overheat prevention logic unit 15B, a second diagnostic result flag FB set by a second failure diagnostic unit 17B, the supply electric-current value of second inverter 1B sensed by the aforementioned second supply electric-current sensing device, the temperature TB related to second inverter 1B outputted by second temperature sensor 16B, the values of the output electric currents iu2, iv2, and iw2 sensed by the aforementioned second output electric-current sensing device.

Both of first electric-current limit value calculating unit 13A and second electric-current limit value calculating unit 13B use the steering torque indicated by the steering torque signal ST, the steering angle indicated by the steering angle signal SA, the target assist torque outputted by target assist torque calculating unit 20, the magnetic pole angle outputted by magnetic pole angle calculating unit 21, the motor rotation speed outputted by motor rotation calculating unit 5, and the q-axis electric-current command value $I_q^*$ and the d-axis electric-current command value $I_d^*$ outputted by target electric-current value calculating unit 3.

First overheat prevention logic unit 15A receives the temperature TA related to first inverter 1A outputted by first temperature sensor (temperature sensing device) 16A. Second overheat prevention logic unit 15B receives the temperature TB related to second inverter 1B outputted by second temperature sensor (temperature sensing device) 16B.

In accordance with the temperature TA related to first inverter 1A, first overheat prevention logic unit 15A sets the first electric-current limit value HA % for overheat protection (upper limit ratio), which is an electric-current limit value for preventing the overheating of first inverter 1A. Similarly, in accordance with the temperature TB related to second inverter 1B, second overheat prevention logic unit 15B sets the second electric-current limit value HB % for overheat protection (upper limit ratio), which is an electric-current limit value for preventing the overheating of second inverter 1B. The term "overheating" used herein indicates the conditions in which the temperature in first inverter 1A or second inverter 1B rises so high that components included therein may have a failure (overheat failure).

In other words, first overheat prevention logic unit 15A changes the first electric current limit value HA % for overheat protection so as to limit a current actually supplied to first inverter 1A to a smaller current as the temperature TA related to first inverter 1A rises, and second overheat prevention logic unit 15B changes the second electric-current limit value HB % for overheat protection so as to limit a current actually supplied to second inverter 1B to a smaller current as the temperature TB related to second inverter 1B rises.

As will be described later, first overheat prevention logic unit 15A uses the first diagnostic result flag FA outputted by first failure diagnostic unit 17A, and the second diagnostic result flag FB outputted by second failure diagnostic unit 17B. Even when the temperature TA related to first inverter 1A does not vary, the first electric-current limit value HA % for overheat protection set by first overheat prevention logic unit 15A, varies according to the first diagnostic result flag FA and the second diagnostic result flag FB. Similarly, second overheat prevention logic unit 15B uses the first diagnostic result flag FA outputted by first failure diagnostic unit 17A, and the second diagnostic result flag FB outputted by second failure diagnostic unit 17B. Even when the temperature TB related to second inverter 1B does not vary, the second electric-current limit value HB % for overheat protection set by second overheat prevention logic unit 15B varies according to the first diagnostic result flag FA and the second diagnostic result flag FB. How to set the first electric-current limit value HA % for overheat protection and the second electric-current limit value HB % for overheat protection will be described in detail later.

First failure diagnostic unit 17A and second failure diagnostic unit 17B make a failure diagnosis of a drive control system in electric motor 140. First failure diagnostic unit 17A makes a diagnosis of the presence or absence of a failure in an energization system (hereinafter referred to as "first energization system") including first inverter 1A. The first energization system is formed of first inverter 1A and a first control unit (voltage divider 6, first output duty calculating unit 7A, first two-phase to three-phase converter unit 8A, and first dead-time compensation unit 9A) for controlling the output of first inverter 1A. Second failure diagnostic unit 17B makes a diagnosis of the presence or absence of a failure in an energization system (hereinafter referred to as "second energization system") including second inverter 1B. The second energization system is formed of second inverter 1B and a second control unit (voltage divider 6, second output duty calculating unit 7B, second two-phase to three-phase converter unit 8B, and second dead-time compensation unit 9B) for controlling the output of second inverter 1B.

First failure diagnostic unit 17A uses the first diagnostic result flag FA as a flag indicating the result of failure diagnosis. First failure diagnostic unit 17A sets the first diagnostic result flag FA to 1 (ON) when the first energization system (first inverter 1A and the first control unit) operates normally, and sets the first diagnostic result flag FA to 0 (OFF) when the first energization system is diagnosed as having failed. The first diagnostic result flag FA set as above is stored in a random access memory (RAM) or the like incorporated in electronic control unit 150. Similarly, second failure diagnostic unit 17B uses the second diagnostic result flag FB as a flag indicating the result of failure diagnosis. Second failure diagnostic unit 17B sets the second diagnostic result flag FB to 1 (ON) when the second energization system (second inverter 1B and the second control unit) operates normally, and sets the second diagnostic result flag FB to 0 (OFF) when the second energization system is diagnosed as having failed. The second diagnostic result flag FB set as above is stored in the RAM or the like incorporated in electronic control unit 150.

The signal indicating the first diagnostic result flag FA is used by first electric-current limit value calculating unit 13A, first overheat prevention logic unit 15A, and second overheat prevention logic unit 15B, and is also outputted, as a command signal for turning ON or OFF the output of first inverter 1A, to an output stop unit, such as a semiconductor relay, provided to first inverter 1A. When the first energization system operates normally without any failure, the output stop unit of first inverter 1A is turned ON to enable the output from first inverter 1A (to cause first inverter 1A to drive electric motor 140). When the first energization system fails, that is, has any failure, the output stop unit of first inverter 1A is turned OFF to disable the output from first inverter 1A (to stop first inverter 1A from driving electric motor 140).

Similarly, the signal indicating the second diagnostic result flag FB is used by second electric-current limit value calculating unit 13B, first overheat prevention logic unit 15A, and second overheat prevention logic unit 15B, and is also outputted, as a command signal for turning ON or OFF the output of second inverter 1B, to an output stop unit provided to second inverter 1B. When the second energization system operates normally without any failure, the output stop unit of second inverter 111 is turned ON to enable the output from second inverter 1B (to cause second inverter 1B to drive electric motor 140). When the second energization system fails, that is, has any failure, the output stop unit of second inverter 1B is turned OFF to disable the output from second inverter 1B (to stop second inverter 1B from driving electric motor 140).

Based on the first electric-current limit value HA % for overheat protection outputted from first overheat prevention logic unit 15A, the first diagnostic result flag FA outputted from first failure diagnostic unit 17A, and various signals which provide parameters necessary to determine whether or not steering operation using steering wheel 110 is performed, first electric-current limit value calculating unit 13A calculates the first electric-current limit value CA %. Second electric-current limit value calculating unit 13B, total electric-current limit value calculating unit 14, and voltage divider constant calculating unit 12 use the first electric-current limit value CA % calculated by first electric-current limit value calculating unit 13A. Similarly, based on the second electric-current limit value HB % for overheat protection outputted from second overheat prevention logic unit 15B, the second diagnostic result flag FB outputted from second failure diagnostic unit 17B, and various signals which provide parameters necessary to determine whether or not steering operation using steering wheel 110 is performed, second electric-current limit value calculating unit 13B calculates the second electric-current limit value CB %. First electric-current limit value calculating unit 13A total electric-current limit value calculating unit 14, and voltage divider constant calculating unit 12 use the second electric-current limit value CB % calculated by second electric-current limit value calculating unit 13B.

Total electric-current limit value calculating unit 14 calculates, as the total electric-current limit value CT %, the sum of the first electric-current limit value CA % and the second electric-current limit value CB % (the total electric-current limit value CT %=the first electric-current limit value CA %+the second electric-current limit value CB %). Voltage divider constant calculating unit 12 and target electric-current value calculating unit 3 use the total electric-current limit value CT % thus calculated.

Target electric-current value calculating unit 3 calculates a target electric-current value based on the target assist torque and the like, and calculates the d-axis electric-current command value $I_d^*$ and the q-axis electric-current command value $I_q^*$ by correcting the target electric-current value with the total electric-current limit value CT %. Specifically, when the total electric-current limit value CT % is 100%, target electric-current value calculating unit 3 calculates the d-axis electric-current command value $I_d$ and the q-axis electric-current command value $I_q^*$ based on the uncorrected target electric-current value. When the total electric-current limit value CT % is less than 100%, target electric-current value calculating unit 3 calculates the d-axis electric-current command value $I_d^*$ and the q-axis electric-current command value $I_q^*$ based on the corrected and reduced target electric-current value. Thus, the target electric electric-current limit value CT % is used as a limit value for the total output from all the inverters.

Based on the first voltage divider constant VA %, voltage divider 6 calculates the d-axis voltage command value $V_d1$ and the q-axis voltage command value $V_q1$ for first coil set 2A. Based on the second voltage divider constant VB %, voltage divider 6 calculates the d-axis voltage command value $V_d2$ and the q-axis voltage command value $V_q2$ for second coil set 2B. This allows electronic control unit 150 to change the output ratio between first inverter 1A and second inverter 1B by changing the first electric-current limit value CA % and the second electric-current limit value CB % respectively used in calculation of the first voltage divider constant VA % and the second voltage divider constant VB % even when at least either of the first and second energization systems fails.

In electronic control unit 150 described above, first overheat prevention logic unit 15A, second overheat prevention logic unit 15B, first electric-current limit value calculating unit 13A, second electric-current limit value calculating unit 13B, total electric-current limit value calculating unit 14, and voltage divider constant calculating unit 12 operate in cooperation with one another to serve as an output correcting unit 18. When first failure diagnostic unit 17A or second failure diagnostic unit 17B diagnoses the inverter in either of the energization system as failing, output correcting unit 18 reduces the output ratio of the failing inverter, which is diagnosed as having failed, while increasing the output ratio of the normally operating inverter, which is diagnosed as having not failed. Thereby, output correcting unit 18 prevents a drop in the total output from all the inverters after the diagnosis of failing (hereinafter referred to as "after the failure-positive diagnosis"). If steering operation is performed after the diagnosis of failing is made, output correcting unit 18 gradually lowers the limit value for the total output from all the inverters in order for overheat protection.

Figure 3:
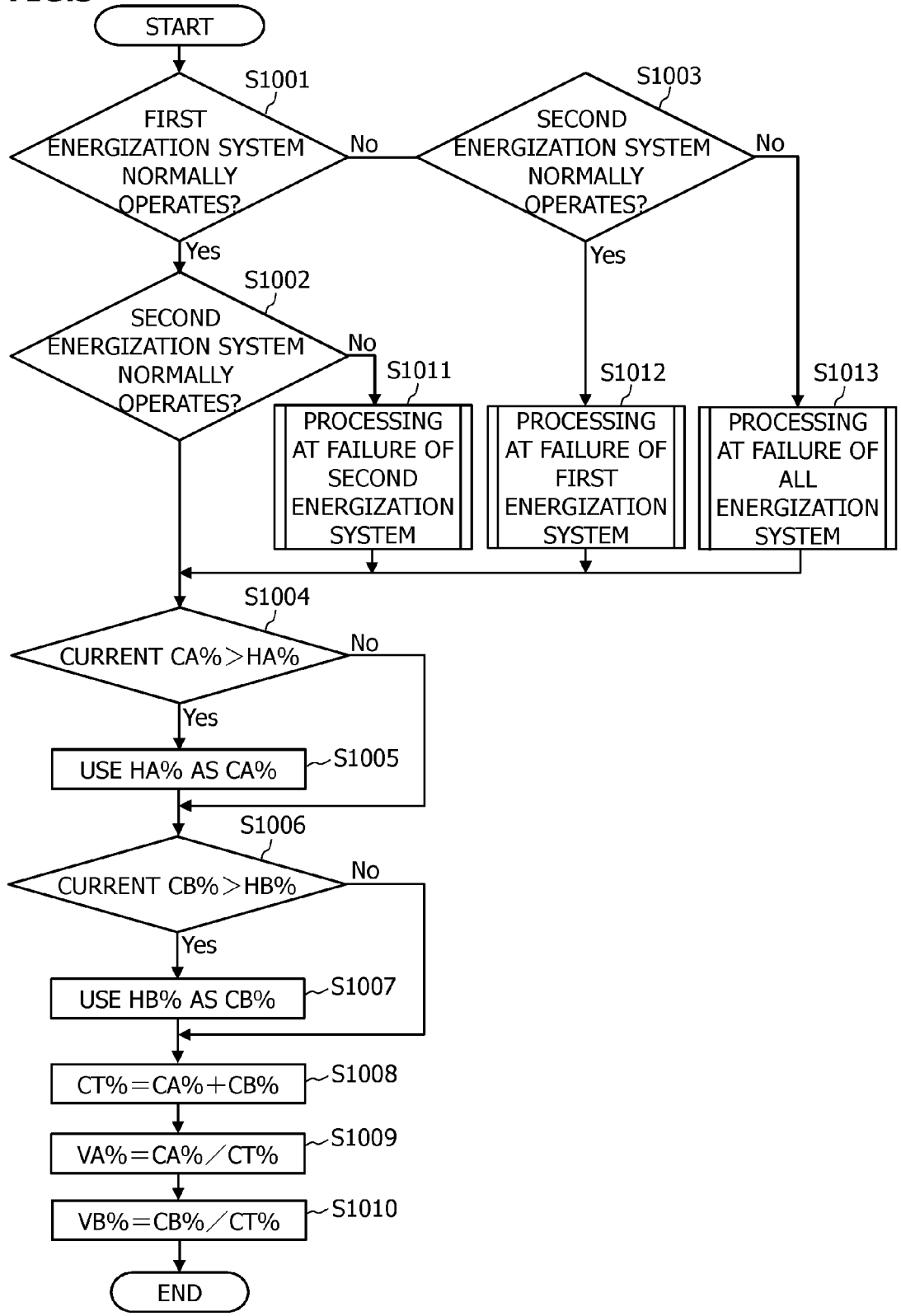
FIG. 3 is a flowchart illustrating an example of processing for setting the output ratio between a first inverter and a second inverter, and a limit value for the total output of all the inverters according to the embodiment of the present invention.

The flowchart of FIG. 3 illustrates an example of calculation processing for calculating the total electric-current limit value CT %, the first voltage divider constant VA %, and the second voltage divider constant VB % performed by first failure diagnostic unit 17A, second failure diagnostic unit 17B, and output correcting unit 18 from which first overheat prevention logic unit 15A and second overheat prevention logic unit 15B are excluded in electronic control unit 150.

The processing routine illustrated in the flowchart of FIG. 3 is performed by electronic control unit 150 as interrupt processing at predetermined time intervals (for example, every 1 ms). At the start of this processing routine, the initial value for each of the first electric-current limit value CA % and the second electric-current limit value CB % is set to 50%. With this initial setting, the output ratio between first inverter 1A and second inverter 1B is set to 50%:50%, and the total electric-current limit value CT %, which is the limit value for the total output from all the inverters, is set to 100%.

In step 1001 (abbreviated as "S1001" in the drawings, the same applies to the other steps below), first failure diagnostic unit 17A makes a diagnosis of the presence or absence of a failure in the first energization system by a known method. When the first energization system is diagnosed as having not failed, the operation proceeds to step 1002 (Yes). When the first energization system is diagnosed as having failed, the operation proceeds to step 1003 (No).

In step 1002, second failure diagnostic unit 17B makes a diagnosis of the presence or absence of a failure in the second energization system by a known method. When the second energization system is diagnosed as having not failed, it is presumed that both of the first and second energization systems operate normally without any failure, and the operation proceeds to step 1004 (Yes) for executing the overheat protection processing. When the second energization system is diagnosed as having failed, it is presumed that only the second energization system fails, and the operation proceeds to step 1011 (No) for executing processing at failure of the second energization system.

In step 1003 as well, second failure diagnostic unit 17B makes a diagnosis of the presence or absence of a failure in the second energization system by a known method. When the second energization system is diagnosed as having not failed, it is presumed that only the first energization system fails, and the operation proceeds to step 1012 (Yes) for executing processing at failure of the first energization system. When the second energization system is diagnosed as having failed, it is presumed that both of the first and second energization systems fail, and the operation proceeds to step 1013 (No) for executing processing at failure of all the energization systems.

In step 1004, first electric-current limit value calculating unit 13A determines whether or not the current first electric-current limit value CA % is greater than the first electric-current limit value HA % for overheat protection so as to assess the need for overheat protection of first inverter 1A. In the after-mentioned processing concurrently performed with the processing of FIG. 3, the first electric-current limit value HA % for overheat protection is calculated by first overheat prevention logic unit 15A in accordance with the temperature TA related to first inverter 1A. The first electric-current limit value HA % thus calculated is used by first electric-current limit value calculating unit 13A in step 1004.

When it is determined that the current first electric-current limit value CA % is greater than the first electric-current limit value HA % for overheat protection, the operation proceeds to step 1005 (Yes). When it is determined that the current first electric-current limit value CA % is not greater than the first electric-current limit value HA % for overheat protection, the operation skips step 1005, and proceeds to step 1006 (No).

In step 1005, the first electric-current limit value HA % for overheat protection is used as the first electric-current limit value CA %, and thereby the first electric-current limit value CA % is lowered to the first electric-current limit value HA % for overheat protection. This is because, in step 1004, it is determined that the current first electric-current limit value CA % is greater than the first electric-current limit value HA % for overheat protection, which is a limit value for preventing the overheating of first inverter 1A, in other words, it is determined that the overheating of first inverter 1A cannot be prevented if current supply to first inverter 1A is continued with the current first electric-current limit value CA %.

In step 1006, second electric-current limit value calculating unit 13B determines whether or not the current second electric-current limit value CB % is greater than the second electric-current limit value HB % for overheat protection so as to assess the need for overheat protection of second inverter 1B. In the after-mentioned processing concurrently performed with the processing of FIG. 3, the second electric-current limit value HB % for overheat protection is calculated by second overheat prevention logic unit 15B in accordance with the temperature TB related to second inverter 1B. The second electric-current limit value HB % thus calculated is used by second electric-current limit value calculating unit 13B in step 1006. When it is determined that the current second electric-current limit value CB % is greater than the second electric-current limit value HB % for overheat protection, the operation proceeds to step 1007 (Yes). When it is determined that the current second electric-current limit value CB % is not greater than the second electric-current limit value HB % for overheat protection, the operation skips step 1007, and proceeds to step 1008 (No).

In step 1007, the second electric-current limit value HB % for overheat protection is used as the second electric-current limit value CB %, and thereby the second electric-current limit value CB % is lowered to the second electric-current limit value HB % for overheat protection. This is because, in step 1006, it is determined that the current second electric-current limit value CB % is greater than the second electric-current limit value HB % for overheat protection, which is a limit value for preventing the overheating of second inverter 1B, in other words, it is determined that the overheating of second inverter 1B cannot be prevented if current supply to second inverter 1B is continued with the current second electric-current limit value CB %.

In step 1008, total electric-current limit value calculating unit 14 calculates, as the total electric-current limit value CT %, the sum of the first electric-current limit value CM and the second electric-current limit value CB %. When target electric-current value calculating unit 3 uses the total electric-current limit value CT % thus calculated, the total output from all the inverters, which are first inverter 1A and second inverter 1B, can be limited.

In step 1009, voltage divider constant calculating unit 12 calculates, as the first voltage divider constant VA %, the ratio of the first electric-current limit value CA % to the total electric-current limit value CT % (the first voltage divider constant VA % the first electric-current limit value CA %/the total electric-current limit value CT %).

In step 1010, similarly to step 1009, voltage divider constant calculating unit 12 calculates, as the second voltage divider constant VB %, the ratio of the second electric-current limit value CB % to the total electric-current limit value CT % (the second voltage divider constant VB %=the second electric-current limit value CB %/the total electric-current limit value CT %).

By using the first voltage divider constant VA % and the second voltage divider constant VB %, voltage divider 6 determines the output ratio between first inverter 1A and second inverter 1B.

Based on the diagnosis of failure occurrence in the second energization system, the processing at failure of the second energization system is performed in step 1011. After this processing is completed, the operation proceeds to step 1004. The details of the processing subroutine at failure of the second energization system will be described later.

Based on the diagnosis of failure occurrence in the first energization system, the processing at failure of the first energization system is performed in step 1012. After this processing is completed, the operation proceeds to step 1004. The details of the processing subroutine at failure of the first energization system will be described later.

Based on the diagnosis of failure occurrence in both of the first and second energization systems, the processing at failure of all the energization systems is performed in step 1013. After this processing is completed, the operation proceeds to step 1004. The details of the processing subroutine at failure of all the energization systems will be described later.

Figure 4:
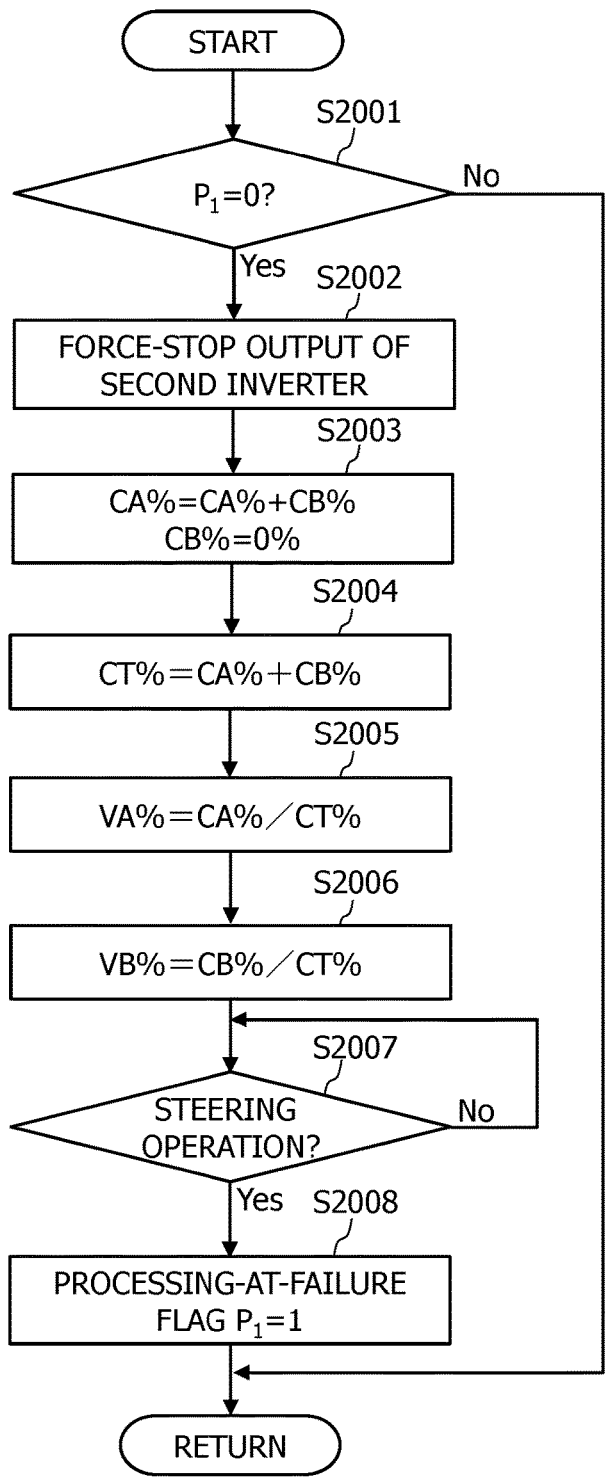
FIG. 4 is a flowchart illustrating an example of subroutine of processing at failure of a second energization system of FIG. 3 according to the embodiment of the present invention.

The flowchart of FIG. 4 illustrates an example of the processing subroutine at failure of the second energization system, which is indicated as step 1011 in FIG. 3. The initial value for the processing-at-failure flag $P_1$ is set to 0.

In step 2001, it is determined whether or not the processing-at-failure flag $P_1$ is 0. Here, the processing-at-failure flag $P_1$ indicates whether or not the processing-at-failure in step 2002 to step 2008 has already been performed, and is changed from 0 to 1 when the processing in step 2008 is performed after the processing in step 2002 to step 2007 is performed.

When the processing-at-failure flag $P_1$ is determined to be 0, the operation proceeds to step 2002 (Yes) for executing the processing-at-failure. When the processing-at-failure flag $P_1$ is determined to be 1, which indicates that the processing-at-failure has already performed, the operation skips the processing-at-failure in step 2002 to step 2008, and proceeds to step 1004 (No) for executing the overheat protection processing in step 1004 to step 100 of FIG. 3.

In step 2002, the output of second inverter 113 included in the second energization system that is diagnosed as having failed is force-stopped. Specifically, when the second energization system is diagnosed as having failed in step 1002, second failure diagnostic unit 17B sets the second diagnostic result flag FB to 1, and a signal based on this second diagnostic result flag FB is inputted to the output stop unit of second inverter 1B. Thereby, the output of second inverter 1B is stopped.

In step 2003, first electric-current limit value calculating unit 13A calculates a new first electric-current limit value CA % by adding the current second electric-current limit value CB % to the current first electric-current limit value CA %, and second electric-current limit value calculating unit 13B changes the second electric-current limit value CB % to 0%.

In this embodiment, the current first electric-current limit value CA % remains the initial value, 50%, and the current second electric-current limit value CB % remains the initial value, 50% at the start of step 2003. Accordingly, the first electric-current limit value CA % is changed to 100% and the second electric-current limit value CB % is changed to 0%. Thereby, the output ratio of first inverter 1A included in the first energization system that is diagnosed as operating normally is increased to 100%, and the output ratio of second inverter 1B included in the second energization system that is diagnosed as having failed is reduced to 0%.

On the other hand, when the current first electric-current limit value CA % and the current second electric-current limit value CB % are reduced, for example, to 40% for the purpose such as overheat protection at the start of step 2003, the first electric-current limit value CA % is changed to 80%, and the second electric-current limit value CB % is changed to 0%.

When the first electric-current limit value CA % and the second electric-current limit value CB % before the failure-positive diagnosis are, for example, both 50%, the total electric-current limit value CT % (=the first electric-current limit value CA %+the second electric-current limit value CB %) remains unchanged at 100% before and after the failure occurrence. This means that the target electric-current value calculated based on the target assist torque by target electric-current value calculating unit 3 is not corrected to be reduced with the total electric-current limit value CT %, thus preventing or reducing the decline of the total output from all the inverters after the failure-positive diagnosis. This prevents the phenomenon in which, when steering operation is resumed after the failure-positive diagnosis, the required steering force increases abruptly compared to that before the failure-positive diagnosis.

The output of second inverter 1B is turned off directly by the output stop unit of second inverter 1B receiving the signal indicating the second diagnostic result flag FB from second failure diagnostic unit 17B in step 2002. In addition, if operating normally, the second control unit in the second energization system can also limit the output of second inverter 111 in step 2003, so as to allow two-way output stop.

In step 2004 to step 2006, based on the first electric-current limit value CA % and the second electric-current limit value CB % which are changed in step 2003, the total electric-current limit value CT %, the first voltage divider constant VA %, and the second voltage divider constant VB % are calculated. Thereby, the output ratio between first inverter 1A and second inverter 1B, and the limit value for the total output from all the inverters are set in accordance with the diagnosis that the second energization system fails. The details of the processing in step 2004 to step 2006 are the same as that in step 1008 to step 1010, and thus the description therefor is omitted herein.

In step 2007, first electric-current limit value calculating unit 13A determines whether or not steering operation using steering wheel 110 is performed.

Specifically, it can be determined that steering operation using steering wheel 110 is performed when either of the following values becomes not less than a predetermined value set therefor: the d-axis electric-current command value $I_d^*$, the q-axis electric-current command value $I_q^*$, and the sensed or calculated values, or values estimated by a known method, of the parameters such as the steering torque ST, the magnetic pole angle (magnetic pole position) of electric motor 140, the rotation speed of electric motor 140, the steering angle SA of steering wheel 110, the rotation speed of steering wheel 110, and the output electric currents iu1, iv1, and iw1 flowing through coils $U_A$, $V_A$, and $W_A$ of first coil set 2A or the supply electric current.

When it is determined that steering operation using steering wheel 110 is performed in step 2007, the operation proceeds to step 2008 (Yes). When it is determined that steering operation using steering wheel 110 is not performed, step 2007 is repeated (No).

In step 2008, the processing-at-failure flag $P_1$ is set to 1, which indicates that the processing-at-failure in step 2002 to step 2006 has already performed, and the operation proceeds to step 1004 for executing the overheat protection processing.

As described above, when it is determined that steering operation is not performed in step 2007, the operation does not proceed to step 2008, and thus does not proceed to the overheat protection processing in step 1004 to step 1007. This aims at preventing the first electric-current limit value CA % from declining based on the first electric-current limit value HA % for overheat protection. Thereby, when steering operation is resumed, the total electric-current limit value CT % remains unchanged from before the failure-positive diagnosis, and the limit value for the total output from all the inverters also remains unchanged before and after the failure-positive diagnosis. Accordingly, the actual steering assist force generated by electric motor 140 and the like is less prone to change relative to the target assist torque calculated by target assist torque calculating unit 20 from before the failure-positive diagnosis. Thus, the required steering force is prevented from abruptly increasing so much as to affect the controllability of vehicle 200.

Figure 5:
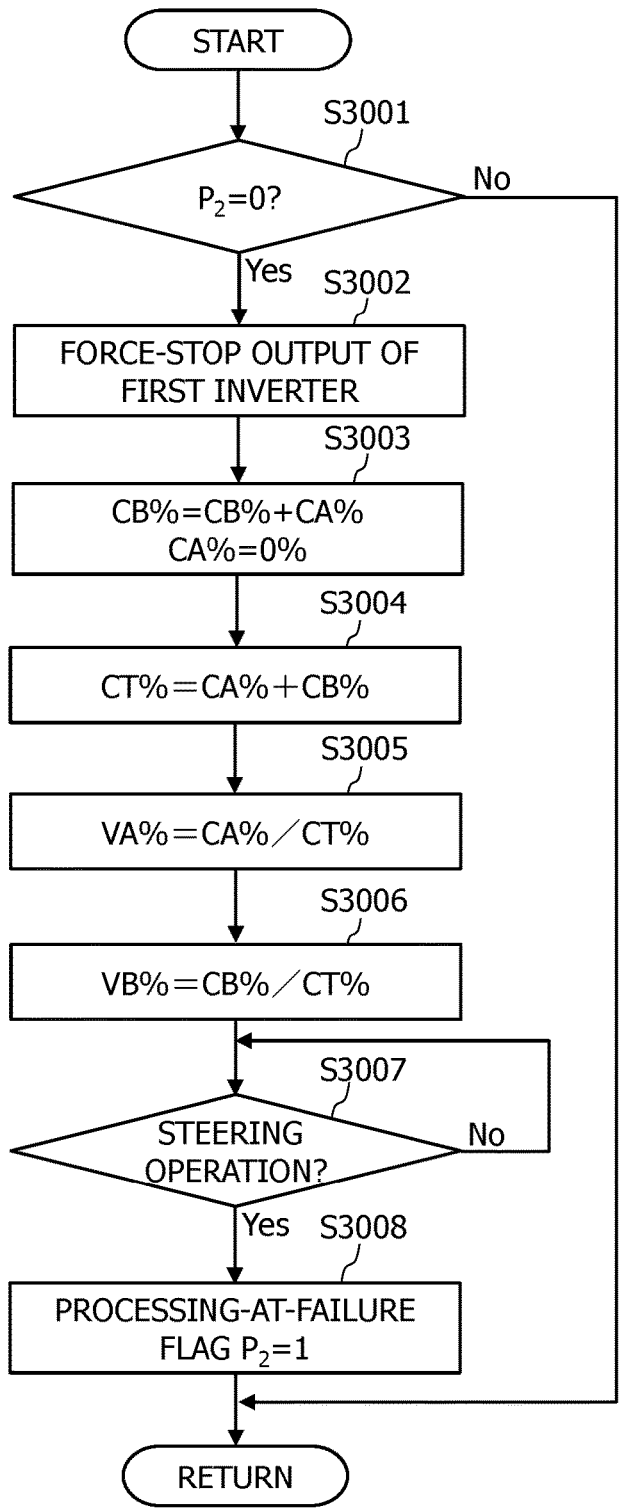
FIG. 5 is a flowchart illustrating an example of subroutine of processing at failure of a first energization system of FIG. 3 according to the embodiment of the present invention.

The flowchart of FIG. 5 illustrates an example of the processing subroutine at failure of the first energization system, which is indicated as step 1012 in FIG. 3. The initial value for the processing-at-failure flag $P_2$ is set to 0.

Similarly to step 2001 to step 2008, in which the processing at failure of the second energization system including second inverter 1B and the like are performed, the processing at failure of the first energization system including first inverter 1A and the like are performed in step 3001 to step 3008, and thus the description therefor will be made briefly.

In step 3001, similarly to step 2001, when the processing-at-failure flag $P_2$, which indicates whether or not the processing-at-failure in step 3002 to step 3008 has already been performed, is determined to be 0, which indicates the processing-at-failure has not performed yet, the operation proceeds to step 3002 (Yes) for executing the processing-at-failure. On the other hand, when the processing-at-failure flag P₂ is determined to be 1, which indicates that the processing-at-failure has already performed, the operation skips the processing-at-failure in step 3002 to step 3008, and proceeds to step 1004 (No) for executing the overheat protection processing in step 1004 to step 1007 of FIG. 3.

In step 3002, similarly to step 2002, the output of first inverter 1A included in the first energization system that is diagnosed as having failed is force-stopped.

In step 3003, similarly to step 2003, second electric-current limit value calculating unit 13B calculates a new second electric-current limit value CB % by adding the current first electric-current limit value CA % to the current second electric-current limit value CB %, and first electric-current limit value calculating unit 13A changes the first electric-current limit value CA % to 0%. The processing in step 3004 to step 3006 is similar to that in step 2004 to step 2006.

In step 3007, similarly to step 2007, second electric-current limit value calculating unit 133 determines whether or not steering operation using steering wheel 110 is performed. When it is determined that steering operation using steering wheel 110 is performed, the operation proceeds to step 3008 (Yes). When it is determined that steering operation using steering wheel 110 is not performed, step 3007 is repeated (No).

In step 3008, similarly to step 2008, the processing-at-failure flag P₂ is set to 1, which indicates that the processing-at-failure in step 3002 to step 3006 has already performed. After completion of step 3008, and the operation proceeds to step 1004 for executing the overheat protection processing.

Figure 6:
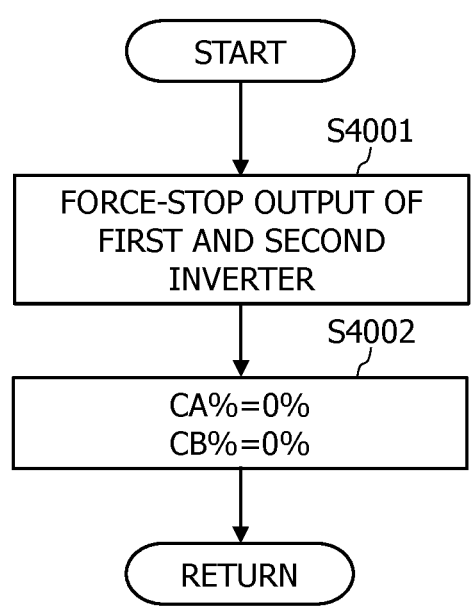
FIG. 6 is a flowchart illustrating an example of subroutine of processing at failure of all the energization systems of FIG. 3 according to the embodiment of the present invention.

The flowchart of FIG. 6 illustrates an example of the processing subroutine at failure of all the inverters, which is indicated as step 1013 in FIG. 3.

In step 4001, the outputs of both first inverter 1A and second inverter 1B included in all the energization systems that are diagnosed as having failed are force-stopped. Specifically, when the first energization system is diagnosed as having failed in step 1001, first failure diagnostic unit 17A sets the first diagnostic result flag FA to 1. When the second energization system is diagnosed as having failed in step 1003, second failure diagnostic unit 1711 sets the second diagnostic result flag FB to 1. Then, the signal based on the first diagnostic result flag FA is inputted to the output stop unit of first inverter 1A, and the signal based on the second diagnostic result flag FB is inputted to the output stop unit of second inverter 1B, thereby stopping the outputs of all the inverters, that is, first inverter 1A and second inverter 1B.

In step 4002, first electric-current limit value calculating unit 13A changes the first electric-current limit value CA % to 0%, and second electric-current Limit value calculating unit 13B changes the second electric-current limit value CB % to 0%. Then, the operation proceeds to step 1004.

Note that, to reduce a processing burden on electronic control unit 150, the overheat protection processing (step 1004 to step 1007) rimy be omitted after completion of the processing in step 4002, since both of the first electric-current limit value CA % and the second electric-current limit value CB % are set to 0% in step 4002.

In step 1009 after completion of the processing in step 4002, the first voltage divider constant VA % is set to 0% in place of calculating "the first voltage divider constant VA % the first electric-current limit value CA %/the total electric-current limit value CT %". In step 1010 after completion of the processing in step 4002, the second voltage divider constant VB % is set to 0% in place of calculating "the second voltage divider constant VB %=the second electric-current limit value CB %/the total electric-current limit value CT %".

Figure 7:
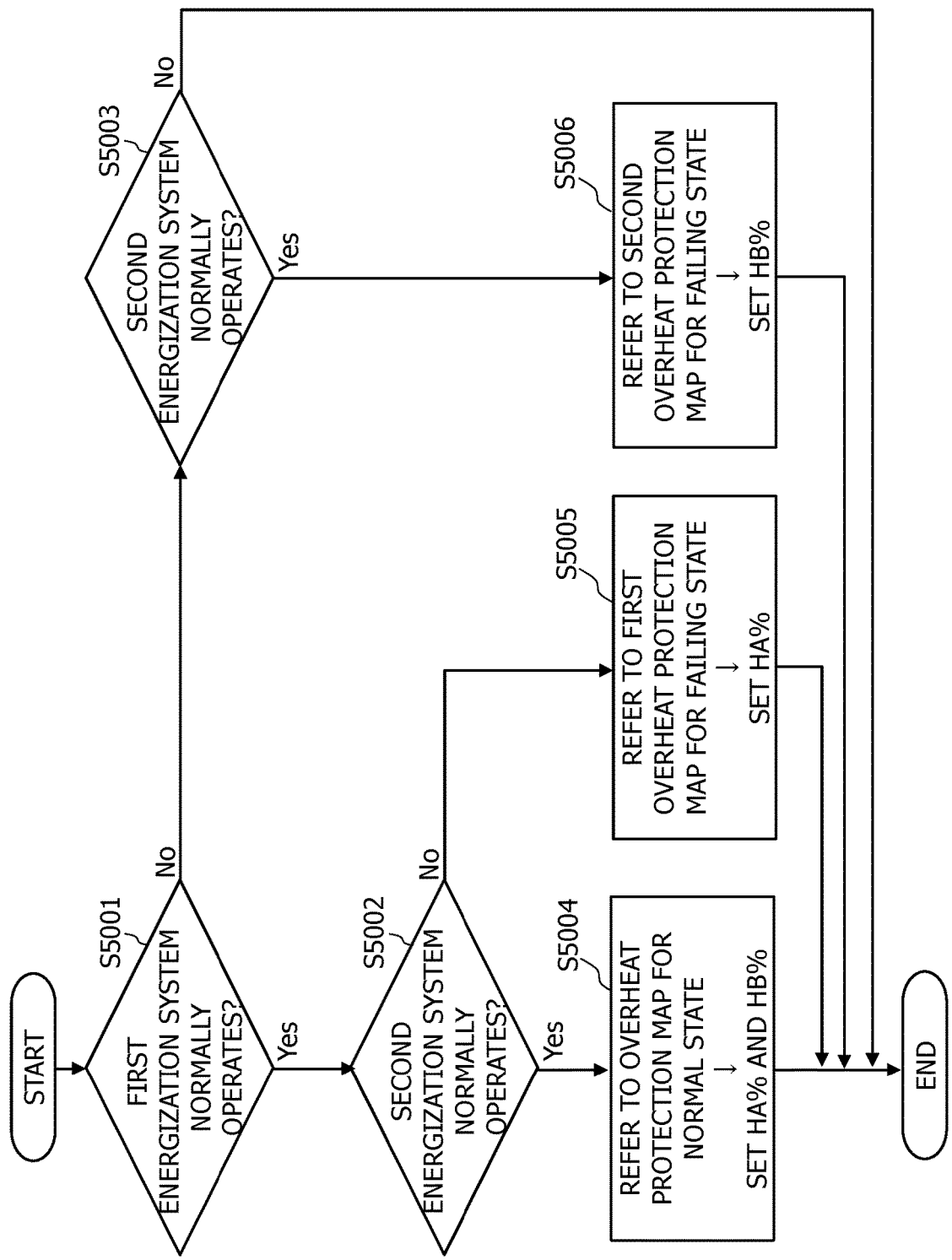
FIG. 7 is a flowchart illustrating an example of processing for setting electric-current limit values for overheat protection according to the embodiment of the present invention.

The flowchart of FIG. 7 illustrates an example of the processing for setting the first electric-current limit value HA % for overheat protection or the second electric-current limit value HB % for overheat protection in accordance with the presence or absence of a failure in the first and second energization systems performed by electronic control unit 150, in other words, an example of the processing performed by first overheat prevention logic unit 15A and second overheat prevention logic unit 15B in output correcting unit 18, and first failure diagnostic unit 17A and second failure diagnostic unit 17B.

The processing routine illustrated in the flowchart of FIG. 7 is performed by electronic control unit 150 as interrupt processing at predetermined time intervals (for example, every 1 ms).

In step 5001 to step 5003, first failure diagnostic unit 17A or second failure diagnostic unit 1713 performs the same processing as in step 1001 to step 1003 described above. When both of the first and second energization systems are diagnosed as operating normally as a result of the processing, the operation proceeds to step 5004. When the first energization system is diagnosed as operating normally but the second energization system is diagnosed as having failed, the operation proceeds to step 5005. When the second energization system is diagnosed as operating normally but the first energization system is diagnosed as having failed, the operation proceeds to step 5006. When both of the first and second energization systems are diagnosed as having failed, the processing routine ends without setting the first electric-current limit value HA % for overheat protection and the second electric-current limit value HB % for overheat protection.

In step 5004, first overheat prevention logic unit 15A and second overheat prevention logic unit 15B set the first electric-current limit value HA % for overheat protection and the second electric-current limit value HB % for overheat protection by referring to overheat protection maps for normal state.

Figure 8A:
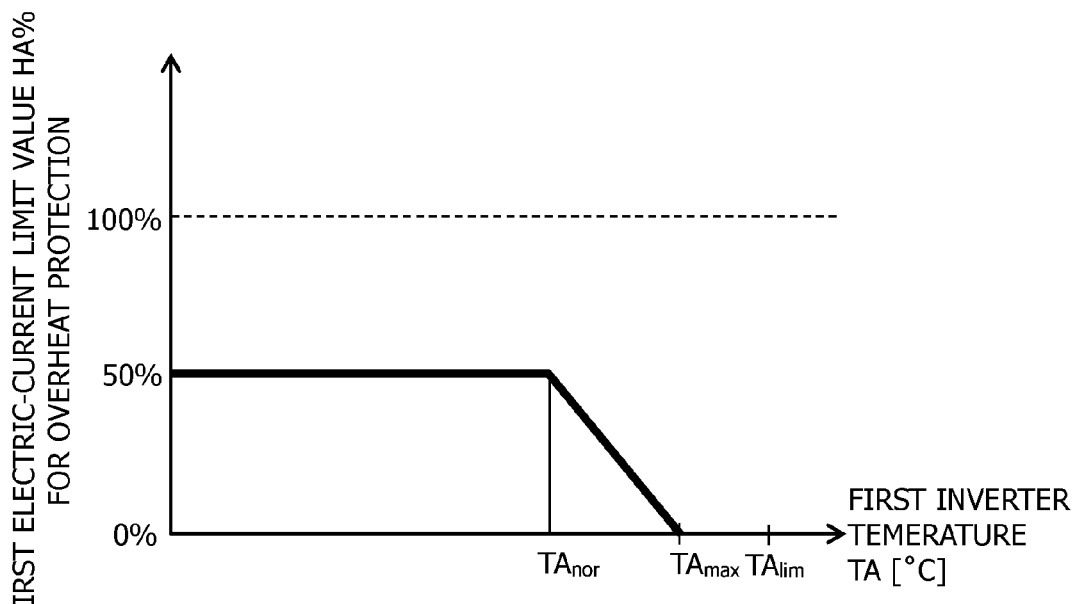
FIGS. 8A and 8B illustrate overheat protection maps for when all the energization systems are diagnosed as operating normally according to the embodiment of the present invention: FIG. SA is for the first inverter.
Figure 8B:
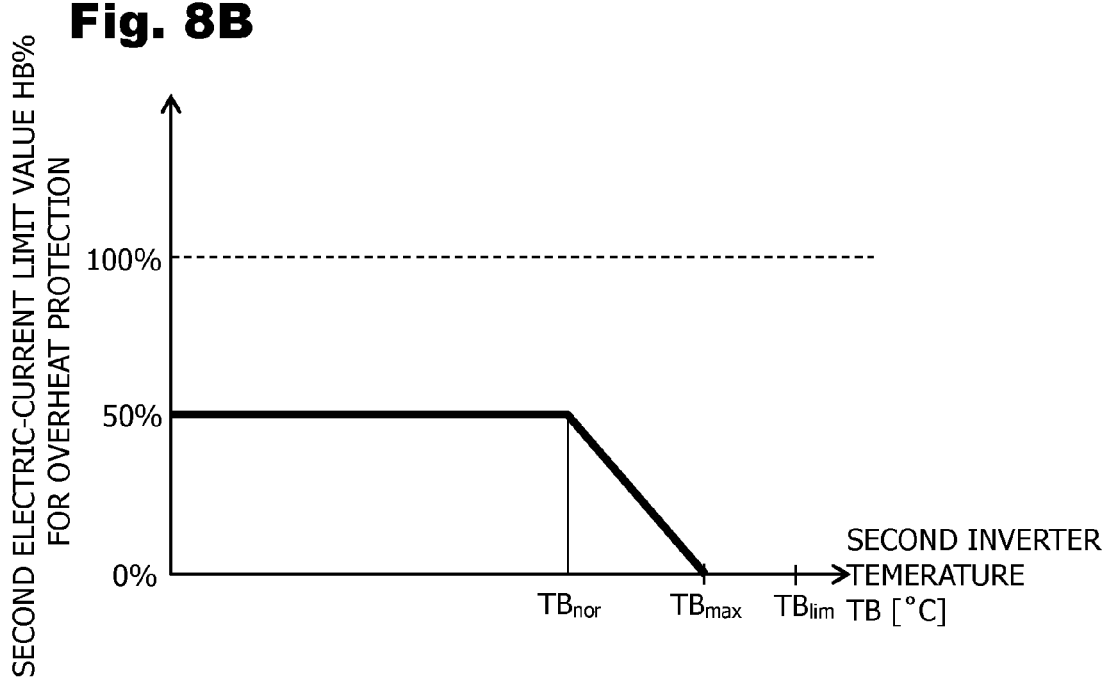

The number of the overheat protection maps for normal state is two: a first overheat protection map for normal state illustrated in FIG. 8A, and a second overheat protection map for normal state illustrated in FIG. 8B. The first overheat protection map for normal state, in which the first electric-current limit value HA % for overheat protection is associated with the temperature TA related to first inverter 1A, is previously stored in first overheat prevention logic unit 15A. The first electric-current limit value HA % for overheat protection is the maximum electric-current value that causes no overheat failure in specific relatively less heat-resistant components in, for example, first inverter 1A in the first energization system.

The second overheat protection map for normal state, in which the second electric-current limit value HB % for overheat protection is associated with the temperature TB related to second inverter 1B, is previously stored in second overheat prevention logic unit 15B. The second electric-current limit value HB % for overheat protection is the maximum electric-current value that causes no overheat failure in specific relatively less heat-resistant components in, for example, second inverter 1B in the second energization system. In this embodiment, the first overheat protection map for normal state is the same as the second overheat protection map for normal state since first inverter 1A has the same configuration as that of second inverter 1B. Alternatively, however, the first overheat protection map for normal state may be different from the second overheat protection map for normal state when first inverter 1A has a configuration different from that of second inverter 1B.

Hereinafter, the overheat protection maps for normal state will be described more specifically by using the first overheat protection map for normal state as an example. The temperature TA related to first inverter 1A is associated with the first electric-current limit value HA % for overheat protection in such a manner that the first electric-current limit value HA % for overheat protection is fixed at 50% when the temperature TA is below a predetermined temperature $TA_{nor}$, gradually lowered from 50% as the temperature TA increases from the predetermined temperature $TA_{nor}$, and becomes 0% when the temperature TA reaches a maximum temperature $TA_{max}$.

Thus, in the aforementioned step 1004, while the temperature TA related to first inverter 1A is less than the predetermined temperature $TA_{nor}$, the current first electric-current limit value CA % does not exceed the first electric-current limit value HA % for overheat protection as long as the current first electric-current limit value CA % is set to its initial value of 50%. Accordingly, the processing for lowering the first electric-current limit value CA % in the aforementioned step 1005 is not performed.

While the temperature TA increases from the predetermined temperature $TA_{nor}$ toward the maximum temperature the first electric-current limit value HA % for overheat protection is gradually lowered. In this case, it is determined that the first electric-current limit value CA % is greater than the first electric-current limit value HA % for overheat protection in the aforementioned step 1004. Accordingly, the processing in the aforementioned step 1005 is performed so that the first electric-current limit value CA % is gradually lowered. The first electric-current limit value CA % is limited to stop electric-current supply to first inverter 1A while the temperature TA is equal to or greater than the maximum temperature $TA_{max}$. The lowering rate of the first electric-current limit value HA % for overheat protection with respect to change in the temperature TA related to first inverter 1A is set in such a manner as to prevent the required steering force from abruptly increasing so much as to affect the controllability of vehicle 200 along with a rise in the temperature of first inverter 1A.

The maximum temperature $TA_{max}$ in the first overheat protection map for normal state is set lower than a heat-resistance limit temperature $TA_{lim}$. The heat-resistance limit temperature $TA_{lim}$ is a temperature of specific components (temperature near a junction between switching semiconductor devices, for example) in first inverter 1A at which an overheat failure occurs in the components under the conditions where no current is supplied thereto. Using the maximum temperature $TA_{max}$ which is different from the heat-resistance limit temperature $TA_{lim}$, allows the consideration of factors such as influence of heat generation in the other components and a temperature difference between temperature sensor 16A and the specific components due to positional relationship therebetween, and thereby further reduces the possibility of overheat failure occurrence in first inverter 1A.

In the first overheat protection map for normal state, the first electric-current limit value HA % for overheat protection is set to 50% when the temperature TA is below the predetermined temperature $TA_{nor}$. In the second overheat protection map for normal state, the second electric-current limit value HB % for overheat protection is set to 50% when the temperature TB is below the predetermined temperature $TB_{nor}$. This setting aims at setting the initial value for the output ratio between first inverter 1A and second inverter 1B to 50%:50% to make a current supplied from first inverter 1A equal to a current supplied from second inverter 1B when the first and second energization systems do not fail. This makes it possible to minimize the total amount of heat generation in first inverter 1A and second inverter 1B that varies approximately proportionally to the square of the electric-current value.

As described above, the first electric-current limit value HA % for overheat protection is gradually lowered from 50% as the temperature TA increases from the predetermined temperature $TA_{nor}$, and becomes 0% when the temperature TA reaches the maximum temperature $TA_{max}$. The second electric-current limit value HB % for overheat protection is gradually lowered from 50% as the temperature TB increases from the predetermined temperature $TB_{nor}$, and becomes 0% when the temperature TB reaches the maximum temperature $TB_{max}$. The reason why these settings are employed will be described by using the first overheat protection map for normal state as an example. Under the conditions where a current is supplied to first inverter 1A with the first electric-current limit value HA % for overheat protection set to 50%, the temperature TA related to first inverter 1A reaches the predetermined temperature $TA_{nor}$ when relatively less heat-resistant specific components in the first energization system reach the maximum temperature $TA_{max}$.

By referring to the first overheat protection map for normal state, first overheat prevention logic unit 15A sets the first electric-current limit value HA % for overheat protection based on the temperature TA related to first inverter 1A obtained from first temperature sensor 16A. Similarly, by referring to the second overheat protection map for normal state, second overheat prevention logic unit 15B sets the second electric-current limit value HB % for overheat protection based on the temperature TB related to second inverter 1B obtained from second temperature sensor 1613.

In step 5005, the first electric-current limit value HA % for overheat protection is set by referring to an overheat protection map for the failing state in which the first energization system is diagnosed as operating normally but the second energization system is diagnosed as having failed (hereinafter referred to as "first overheat protection map for failing state").

Figure 9:
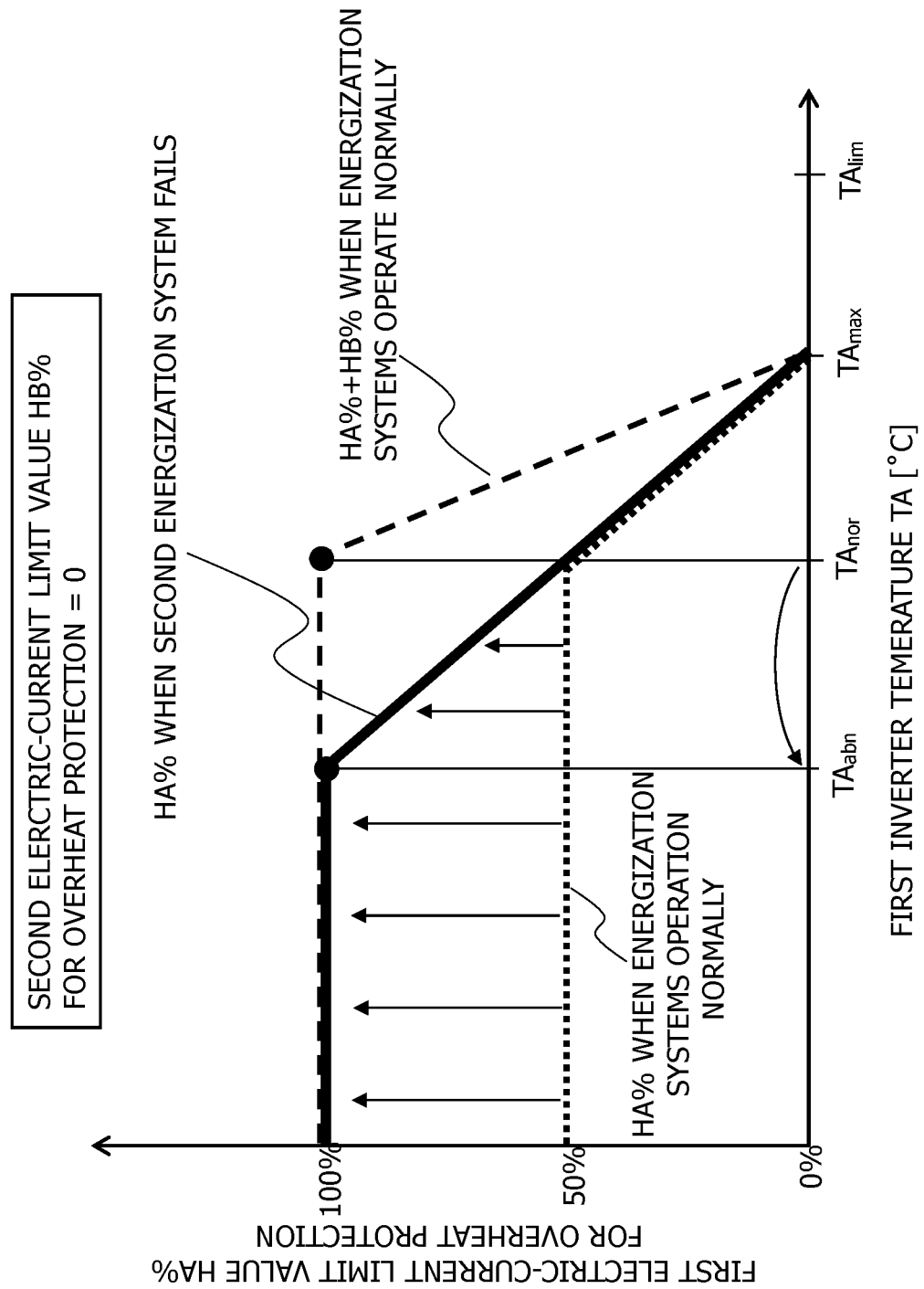
FIG. 9 illustrates a first overheat protection map for failing state for the first inverter prepared for when the second energization system is diagnosed as having failed, according to the embodiment of the present invention.

As illustrated in FIG. 9, the first overheat protection map for failing state, in which the first electric-current limit value HA % for overheat protection is associated with the temperature TA related to first inverter 1A, is previously stored in first overheat prevention logic unit 15A.

More specifically, in the first overheat protection map for failing state, the temperature TA related to first inverter 1A is associated with the first electric-current limit value HA % for overheat protection in such a manner that the first electric-current limit value HA % for overheat protection is gradually lowered from 100% as the temperature TA increases from the predetermined temperature $TA_{abn}$, and becomes 0% when the temperature TA reaches the maximum temperature $TA_{max}$.

In the first overheat protection map for failing state, the first electric-current limit value HA % for overheat protection is set to 100% while the temperature TA is below the predetermined temperature $TA_{abn}$. The aim of this setting is to appropriately assess the need for overheat protection in step 1004 in accordance with the conditions where the first electric-current limit value CA % is changed from 50% to 100% after the second energization system is diagnosed as having failed.

Similarly to the aforementioned overheat protection maps for normal state, the first electric-current limit value HA % for overheat protection, which is the maximum electric-current value that causes no overheat failure in specific relatively less heat-resistant components in the first energization system, is raised as the temperature TA related to first inverter 1A decreases from the maximum temperature $TA_{max}$ in the first overheat protection map for failing state. However, the first overheat protection map for failing state is different from the first overheat protection map for normal state in that the first electric-current limit value HA % for overheat protection becomes 100% when the temperature TA reaches the predetermined temperature $TA_{abn}$. The predetermined temperature $TA_{abn}$ is lower than the predetermined temperature $TA_{nor}$ in the aforementioned first overheat protection map for normal state.

When compared with each other, the first electric-current limit value HA % for overheat protection employed when the second energization system fails, which is plotted in the first overheat protection map for failing state, and the first electric current limit value HA % for overheat protection employed when the second energization system operates normally, which is plotted in the first overheat protection map for normal state, are the same while the temperature TA related to first inverter 1A reduces from the maximum temperature $TA_{max}$ to the predetermined temperature $TA_{nor}$. However, these two differ from each other in the following respects: the first electric-current limit value HA % for overheat protection employed when the second energization system operates normally is fixed at 50% while the temperature TA is below the predetermined temperature $TA_{nor}$, while the first electric-current limit value HA % for overheat protection employed when the second energization system fails continues to increase while the temperature TA decreases from below the predetermined temperature $TA_{nor}$ to the predetermined temperature $TA_{abn}$, and is fixed at 100% while the temperature TA is below the predetermined temperature $TA_{abn}$.

According to the comparison between the first electric-current limit value HA % for overheat protection in the first overheat protection map for failing state prepared for when the second energization system fails and the electric-current limit value (HA %+HB %) for overheat protection of all the inverters in the overheat protection maps for normal state, both of them gradually increase until reaching 100% as the temperature TA reduces from the maximum temperature $TA_{max}$. Here, the electric-current limit value (HA %+HB %) for overheat protection of all the inverters is the sum of the first electric-current limit value HA % for overheat protection and the second electric-current limit value HB % for overheat protection. The difference between them is as follows: the electric-current limit value (HA %+HB %) for overheat protection of all the inverters for normal conditions becomes 100% when the temperature TA reaches the predetermined temperature $TA_{nor}$, while the electric-current limit value HA % employed when the second energization system fails becomes 100% when the temperature TA reaches the predetermined temperature $TA_{abn}$, which is lower than the predetermined temperature $TA_{nor}$. Thus, the lowering rate of the first electric-current limit value CA % along with a rise in the temperature TA after a failure-negative diagnosis, that is, after both of the first and second energization systems are diagnosed as having not failed, is different from that after a failure-positive diagnosis, that is, after the second energization system is diagnosed as having failed among the first and second energization systems.

In particular, in the overheat protection processing (step 1004 to step 1007), the lower-limit temperature (predetermined temperature $TA_{abn}$) at which the first electric-current limit value CA % starts to be lowered when the second energization system is diagnosed as having failed is lower than the lower-limit temperature (predetermined temperature $TA_{nor}$) at which both of the first electric-current limit value CA % and the second electric-current limit value CB % start to be lowered when both of the first and second energization systems are diagnosed as operating normally. Such setting has the following aims. First inverter 1A included in the first energization system that is diagnosed as operating normally provides the output whose amount is equal to that normally provided by the two inverters when the second energization system is diagnosed as having failed. Thus, by performing this overheat protection processing, the current supplied to first inverter 1A starts to be limited as early as when the temperature TA reaches a temperature lower than when the second energization system is diagnosed as operating normally so as to prevent a secondary failure from being caused by overheat of the first energization system including first inverter 1A.

In addition, in the overheat protection processing (step 1004 to step 1007), the first electric-current limit value CA % is lowered from 100% along with a rise in the temperature TA related to first inverter 1A at a lower rate when the second energization system is diagnosed as having failed than the rate at which both of the first electric-current limit value CA % and the second electric-current limit value CB % are lowered when both of the first and second energization systems are diagnosed as operating normally. This aims at preventing the required steering force from abruptly increasing along with temperature rise by reducing the lowering speed of the first electric-current limit value CA % along with rise in the temperature TA related to first inverter 1A (that is, by reducing the reduction speed of total output from all the inverters along with temperature rise in first inverter 1A) in consideration of the fact that, when the second energization system is diagnosed as having failed, temperature rise in the components in first inverter 1A included in the first energization system that is diagnosed as operating normally is accelerated since a current whose amount is equal to that normally supplied to the two inverters is focused into first inverter 1A.

In step 5006, the second electric-current limit value HB % for overheat protection is set by referring to an overheat protection map for the failing state in which the second energization system is diagnosed as operating normally but the first energization system is diagnosed as having failed (hereinafter referred to as "second overheat protection map for failing state").

In this embodiment, the second overheat protection map for failing state is similar to the first overheat protection map for failing state since first inverter 1A has the same configuration as that of second inverter 1B. Thus, the description for the second overheat protection map for failing state will be omitted.

Figure 10:
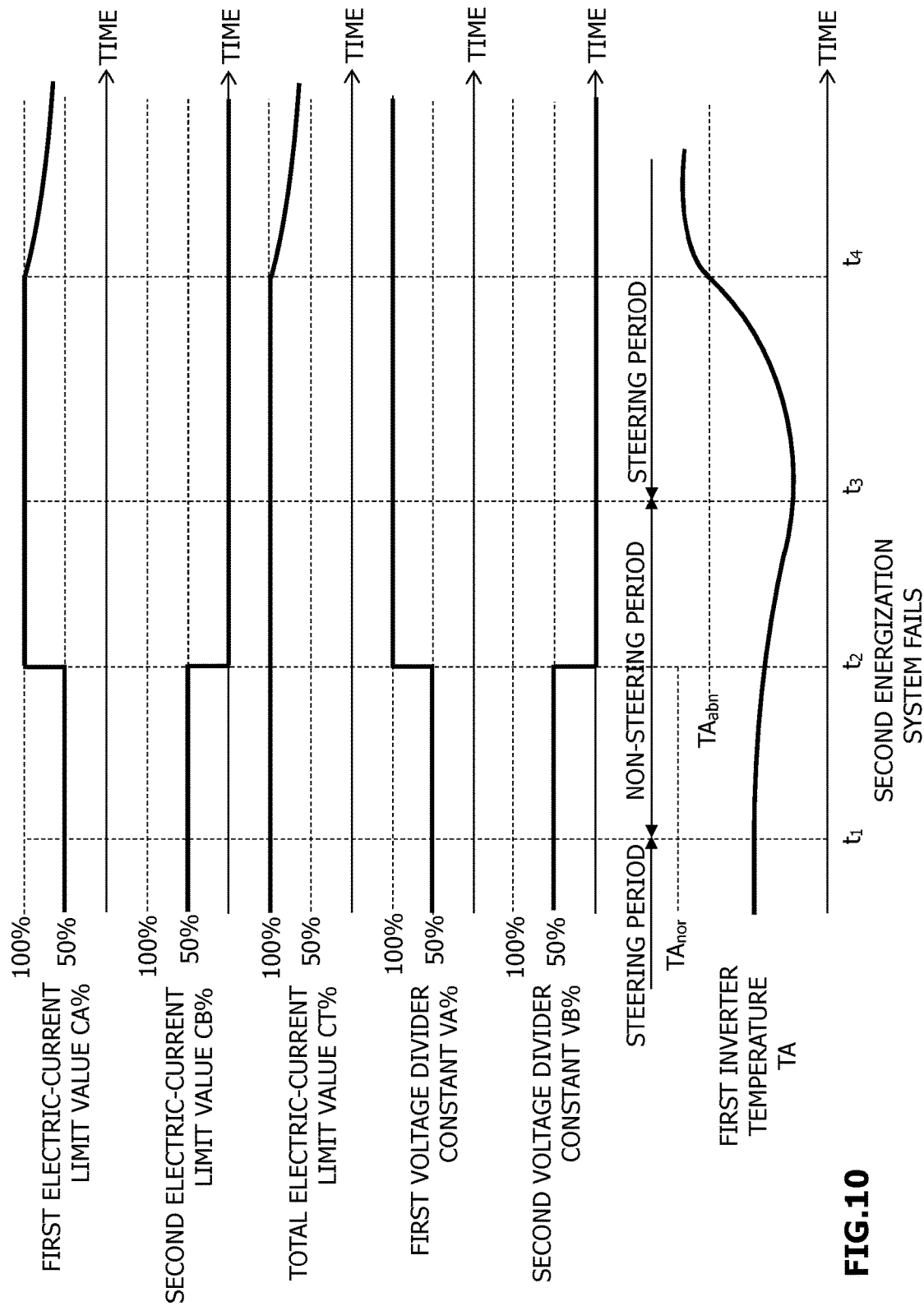
FIG. 10 is a time chart illustrating changes in the output ratio between the first inverter and the second inverter, the electric-current limit values for the first inverter and the second inverter, the limit value for the total output from all the inverters, and the temperature related to a normally operating inverter.

The time chart of FIG. 10 schematically illustrates an example of temporal changes of the first electric-current limit value CA %, the second electric-current limit value CB %, the total electric-current limit value CT %, the first voltage divider constant VA %, and the second voltage divider constant VB % before and after a time point when the second energization system is diagnosed as having failed. In FIG. 10, the driver temporally stops steering operation at time point $t_1$ before failure, and resumes steering operation at time point $t_3$ after the failure-positive diagnosis.

At time point $t_1$, the first electric-current limit value CA % and the second electric-current limit value CB % remain the initial value of 50% since both of the first and second energization systems do not fail, and the temperature TA related to first inverter 1A does not exceed the predetermined temperature $TA_{nor}$ in the overheat protection map for normal state of FIG. 8. The total electric-current limit value CT % is 100%, and the first voltage divider constant VA % and the second voltage divider constant VB % are 50%. Thus, the output ratio between first inverter 1A and second inverter 1B is 50%:50%. The limit value for the total output from all the inverters remains 100%. The torque generated by electric motor 140 is controlled to have a value corresponding to the target assist torque.

At time point $t_2$, the second energization system is diagnosed as having failed. In response, the second electric-current limit value CB % is changed from 50% to 0%, and accordingly the first electric-current limit value CA % is changed from 50% to 100%. Thereby, the ratio between the first voltage divider constant VA % and the second voltage divider constant VB %, that is, the output ratio, is set to 100%:0%, so that the output from second inverter 1B included in the failing second energization system is prohibited while the total electric-current limit value CT % is unchanged at 100% from time point $t_1$ prior to time point $t_2$.

At time point $t_3$ when steering operation is resumed, the overheat protection processing in step 1004 to step 1007 of FIG. 3 is started. At time point $t_4$ when the temperature TA related to first inverter 1A goes beyond the predetermined temperature $TA_{abn}$ in the first overheat protection map for failing state in FIG. 9, the first electric-current limit value CA % is gradually lowered from 100%, and thereby the total electric-current limit value CT % and the first voltage divider constant VA % are gradually lowered from 100%.

In other words, the ratio of the actual steering assist force generated by electric motor 140 and the like (including reducer 160) to the target assist torque calculated by target assist torque calculating unit 20 when steering operation is resumed after the failure-positive diagnosis is substantially the same as before the failure-positive diagnosis. After the failure-positive diagnosis, steering operation is resumed with the steering force assisted by the steering assist force substantially the same as before the failure-positive diagnosis, and then the required steering force is gradually increased for overheat protection.

Thus, even if the driver does not continuously perform steering operation throughout before and after the second energization system is diagnosed as having failed, the driver can be informed of failure occurrence without feeling uncomfortable enough to feel the controllability of vehicle 200 is deteriorated. Thus, the travel safety of vehicle 200 can be improved.

For example, it is conceivable that the temperature TA goes beyond the predetermined temperature $TA_{abn}$ in a non-steering period between time point $t_2$ and time point $t_3$ for reasons such as: the temperature TA related to first inverter 1A already exceed the predetermined temperature $TA_{abn}$ at time point $t_1$. However, even in such case, the first electric-current limit value CA % is not lowered since the overheat protection processing is performed only when steering operation using steering wheel 110 is performed. There is no obvious problem in not immediately performing the overheat protection processing as described above since the target assist torque is not calculated or set to 0 in a non-steering period, and first inverter 1A provides no output, generates no heat, and thus is naturally cooled down.

Assume here that the driver continuously performs steering operation throughout before and after the failure-positive diagnosis. If the second energization system is diagnosed as having failed at time point $t_2$, the second electric-current limit value CB % is changed to 0% and the first electric-current limit value CA % is changed to 100%. In addition, the overheat protection processing is immediately preformed without waiting in step 2007 or step 3007. Thereafter, when the temperature TA related to first inverter 1A goes beyond the predetermined temperature $TA_{abn}$, the first electric-current limit value CA % is gradually lowered, and, in response, the total electric-current limit value CT % and first voltage divider constant VA % are gradually lowered. Thereby, the required steering force is prevented from abruptly increasing after the failure-positive diagnosis, and the driver can be informed of failure occurrence without feeling uncomfortable enough to feel the controllability of vehicle 200 is deteriorated.

In the embodiment described above, the first overheat protection map for failing state illustrated in FIG. 9 is used as an example. However, the present invention is not limited thereto. Alternatively, the first electric-current limit value HA % for overheat protection may be set using the map illustrated in FIG. 11.

Figure 11:
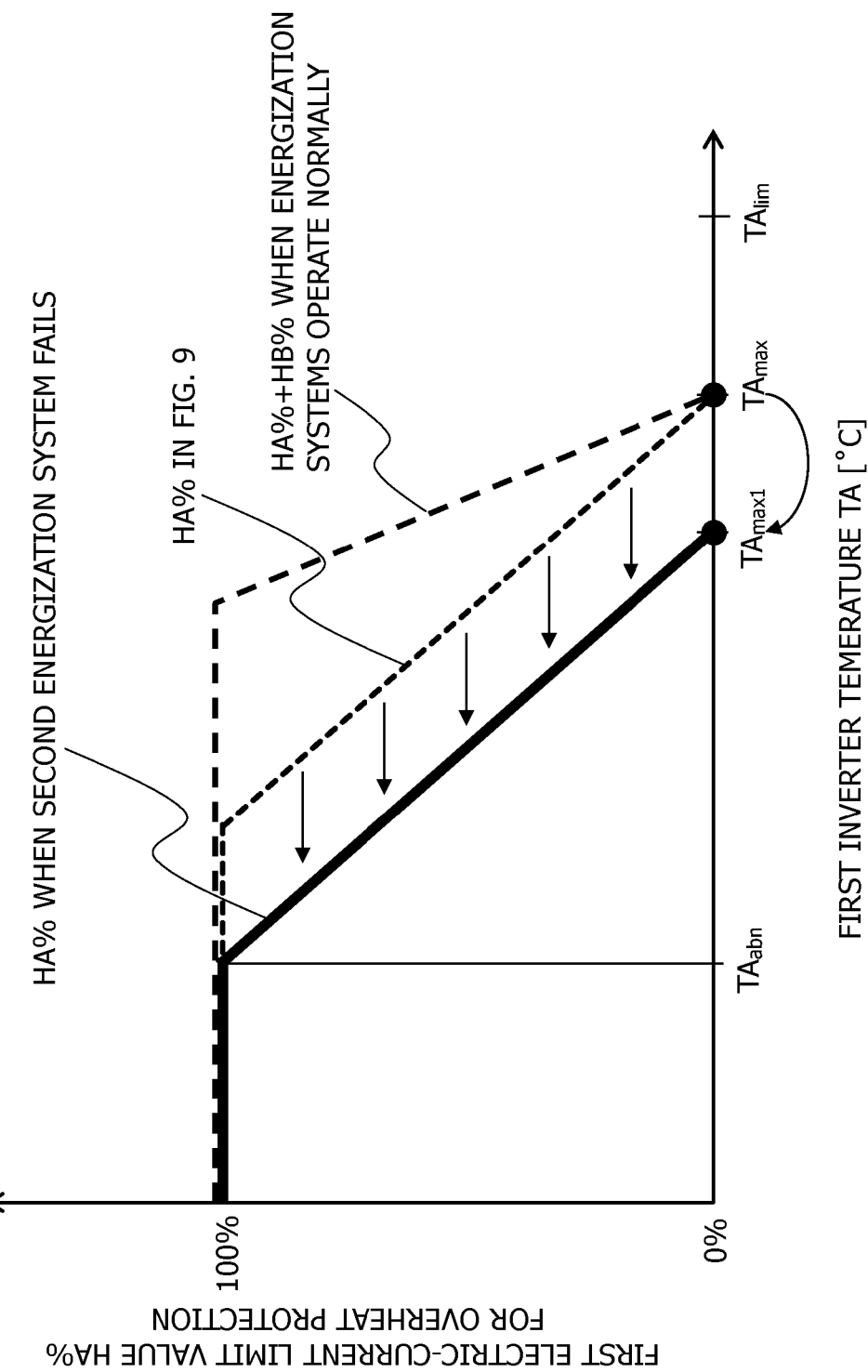
FIG. 11 illustrates another example of the first overheat protection map for failing state in FIG. 9 according to an embodiment of the present invention.

The maximum temperature $TA_{max}$ in the first overheat protection map for failing state in FIG. 9 (hereinafter referred to as "map 1") is higher than the maximum temperature $TA_{max1}$ in the first overheat protection map for failing state in FIG. 11 (hereinafter referred to as "map 2"). Map 2 is different from map 1 in that the inclined portion in which the first electric-current limit value HA % for overheat protection is lowered along with a rise in the temperature TA in map 2 is shifted toward the lower temperature as compared to map 1. Accordingly, the predetermined temperature $TA_{abn}$ in map 2 is also lower than in map 1.

The first electric-current limit value HA % for overheat protection in map 2 is shifted toward the lower temperature as compared to map 1 for the following reasons:

The temperature difference between temperature sensor 16A and specific less heat-resistant components in first inverter 1A included in the first energization system that is diagnosed as operating normally is due to factors such as heat loss during heat transmission between temperature sensor 16A and specific components. The temperature difference between temperature sensor 16A and these specific components during failing state might possibly be higher than during normal state since the amount of a current flowing through first inverter 1A that is diagnosed as operating normally increases during failing state. In addition, these specific components may possibly be affected by heat generated by the other components, although such heat little affects the temperature reading of temperature sensor 16A. Thus, for the same temperature TA, actual temperature of the specific components during the failing state might possibly be higher than during the normal state. Therefore, the first electric-current limit value HA % for overheat protection in map 2 is shifted toward the lower temperature as compared to map 1 so as to more reliably prevent a secondary failure from being caused by overheat of first inverter 1A in the first energization system that is diagnosed as operating normally.

The first electric-current limit value HA % for overheat protection in map 1 and the first electric-current limit value HA % for overheat protection in map 2 may be stored in first overheat prevention logic unit 15A, and first electric-current limit value calculating unit 13A may determine which of them to use based on parameters for defining the output of first inverter 1A in the first energization system that is diagnosed as operating normally. Examples of such parameters include the first electric-current limit value CA %, d-axis electric-current command value $I_d^*$ and q-axis electric-current command value $I_q^*$, and the currents iu1, iv1, and iw1 flowing through coils $U_A$, $V_A$, and $W_A$ of first coil set 2A or the supply electric current.

In the embodiment as described above, when, for example, the second energization system is diagnosed as having failed, the output of second inverter 1B is force-stopped, and the second electric-current limit value CB % is set to 0%. However, if first failure diagnostic unit 17A and second failure diagnostic unit 17B is capable of diagnosing a failure mode in the first and second energization systems, there is a possibility depending on the diagnosed failure mode that, even when, for example, the second energization is diagnosed as having failed, second inverter 1B in the second energization system may be still capable of providing an output. In this case, second inverter 1B in the second energization system that is diagnosed as having failed may be permitted to provide a minimum output to supplement the output of first inverter 1A in the first energization system that is diagnosed as operating normally instead of completely stopping the output of second inverter 1B. For example, in the embodiment described above, the operation may skip step 2002 and proceed to step 2003 in which the second electric-current limit value CB % is lowered to α % (>0%), and a new first electric-current limit value CA % (CA %=CA %+CB %−α %) is calculated by adding the current second electric-current limit value CB % (≠α %) to the current first electric-current limit value CA %, and then subtracting a therefrom.

In the above embodiment, output correcting unit 18 (first electric-current limit value calculating unit 13A and second electric-current limit value calculating unit 13B, in particular) performs the overheat protection processing as follows. When, for example, the second energization system is diagnosed as having failed, the first electric-current limit value CA % for first inverter 1A in the first energization system that is diagnosed as operating normally is lowered based on the first electric-current limit value HA % for overheat protection according to the temperature TA related to first inverter 1A, so that the total electric-current limit value CT % is gradually lowered. Thereby, the limit value for the total output from all the inverters is gradually lowered by lowering the limit value for the output of the inverter included in the energization system that is diagnosed as operating normally (hereinafter referred to as "normally operating inverter") in accordance with the temperature related to the normally operating inverter. Alternatively, however, output correcting unit 18 may perform overheat protection processing by using a parameter other than the temperature related to the normally operating inverter as will be described in the following three examples.

In a first example of overheat protection processing, when, for example, the second energization system is diagnosed as having failed, and when steering operation is performed after this failure-positive diagnosis, output correcting unit 18 may gradually lower the total electric-current limit value CT % by lowering the first electric-current limit value CA % for first inverter 1A in the first energization system that is diagnosed as operating normally, based on changes in the input or output electric current of first inverter 1A or based on the integrated value of the input or output electric current of first inverter 1A.

In a second example of overheat protection processing, when, for example, the second energization system is diagnosed as having failed, and when steering operation is performed after this failure-positive diagnosis, output correcting unit 18 may gradually lower the total electric-current limit value CT % by lowering the first electric-current limit value CA % for first inverter 1A in the first energization system that is diagnosed as operating normally, based on changes in the d-axis electric-current command value $I_d^*$ and the q-axis electric-current command value $I_q^*$ calculated by target electric-current value calculating unit 3 or based on the integrated value of these command values.

In the second example of overheat protection processing, in order to more accurately estimate temperature rise in first inverter 1A and second inverter 1B, it is preferable to lower the total electric-current limit value CT % by lowering the first electric-current limit value CA % for first inverter 1A, based on a value related to the first voltage divider constant VA %, the second voltage divider constant VB %, and the total electric-current limit value CT % calculated by output correcting unit 18, its addition to the d-axis electric-current command value $I_d^*$ and the q-axis electric-current command value $I_q^*$. Examples of the value related to the first voltage divider constant VA %, the second voltage divider constant VB %, and the total electric-current limit value CT % include the output from voltage divider 6, that is, the d-axis voltage command value $V_d1$ and the q-axis voltage command value $V_q1$ for first coil set 2A (first inverter 1A), and the d-axis voltage command value $V_d2$ and the q-axis voltage command value $V_q2$ for second coil set 2B (second inverter 1B).

In a third example of overheat protection processing, when, for example, the second energization system is diagnosed as having failed, and when steering operation is performed after this failure-positive diagnosis, output correcting unit 18 may gradually lower the total electric-current limit value CT % by lowering the first electric-current limit value CA % for first inverter 1A, based on change in the rotation speed of electric motor 140 or based on the integrated value of the rotation speed.

In examples other than these examples of overheat protection processing, output correcting unit 18 may gradually lower the limit value for the total output from all the inverters by lowering the limit value for the output of the normally operating inverter based on a change or integrated value of the magnetic pole angle of electric motor 140, a change or integrated value of the steering torque, a change or integrated value of the angle of steering wheel 110, or a change or integrated value of in the rotation speed of steering wheel 110. Using these parameters in the overheat protection processing allows for estimation of the temperature related to the normally operating inverter. When using any of the aforementioned integrated values for estimating the temperature related to the normally operating inverter, output correcting unit 18 may be configured to reduce the integrated value over time in consideration of temperature reduction of the normally operating inverter due to heat release.

As described above, the device and method for controlling an electric motor according to the present invention are applicable to any electric motor that includes a plurality of energization systems each including an inverter and coils corresponding to different phases.

In the above embodiment, when the number of the energization systems is N (natural number greater than or equal to 2), the number of groups including coils and an inverter is also N, and the initial value for the electric-current limit value for each inverter is set to (100/N)%. If, among the N inverters, M (natural number greater than or equal to 1, where M<N) inverter(s) are diagnosed as having failed, the processing-at-failure may be performed as follows: the output of each inverter diagnosed as having failed is stopped and the electric-current limit value therefor is set to 0%, and the electric-current limit value for the inverter diagnosed as operating normally is increased from (100/N)% to (100/(N−M))%.

In the embodiment, some descriptions are made under the assumption that the second energization system fails while the first energization system operates normally. However, the embodiment can be described similarly under the assumption that the first energization system fails while the second energization system operates normally.

REFERENCE SYMBOL LEST 1A first inverter
1B second inverter
2A first coil set
2B second coil set
3 target electric-current value calculating unit
4 output voltage calculating unit
5 motor rotation calculating unit
6 voltage divider
12 voltage divider constant calculating unit
13A first electric-current limit value calculating unit
13B second electric-current limit value calculating unit
14 total electric-current limit value calculating unit
15A first overheat logic unit
15B second overheat logic unit
16A first temperature sensor
16B second temperature sensor
17A first failure diagnostic unit
17B second failure diagnostic unit
18 output correcting unit
100 electric power steering system
110 steering wheel
140 electric motor
150 electronic control unit

The invention claimed is:

1. A control device tor an electric motor which includes a plurality of energization systems each including an inverter and coils corresponding to different phases, and which generates a steering assist force in an electric power steering system, the control device comprising:
a failure diagnostic unit which diagnoses whether the inverter in any of the energization systems has failed: and
an output correcting unit configured to lower an output limit value for the inverter in each of the energization systems in accordance with a rise in a temperature related to the inverter so that a total output limit value for limiting a total output is limited, the total output limit value being the sum of the output limit values for the inverters, the total output being the sum of outputs from the inverters, wherein
when a failure-positive diagnosis is made in which the failure diagnostic unit diagnoses the inverters in one or some of the energization systems as having failed, the output correcting unit reduces an output of each of failing inverters to a value greater than zero, which are diagnosed as having failed, while raising the output limit value for a normally operating inverter, which is diagnosed as having not failed, so as not to change the total output limit value, and from when steering operation is performed after the failure-positive diagnosis, the output correcting unit lowers the raised output limit value for the normally operating inverter in accordance with a rise in the temperature related to the normally operating inverter so that the output of the normally operating inverter is limited.

2. The control device for an electric motor according to claim 1, wherein, after the steering operation is performed, the output correcting unit maintains the output limit value for the normally operating inverter even if the temperature related to the normally operating inverter decreases.

3. The control device for an electric motor according to claim 1, wherein the temperature related to the normally operating inverter is sensed by a temperature sensing device provided in an interior of the normally operating inverter.

4. The control device for an electric motor according to claim 1, wherein
an amount by which the output correcting unit lowers the output limit value for the normally operating inverter with respect to a rise in the temperature related to the normally operating inverter after the failure-positive diagnosis is different from an amount by which the output correcting unit lowers the output limit value for the inverter in each of the energization systems with respect to a rise in the temperature related to the inverter after a failure-negative diagnosis in which none of the inverters in the energization systems are diagnosed as having failed.

5. The control device for an electric motor according to claim 4, wherein, a first lower-limit temperature used after the failure-positive diagnosis in a manner that, when the temperature related to the normally operating inverter reaches the first lower-limit temperature, the output correcting unit starts to lower the output limit value for the normally operating inverter, is lower than a second lower-limit temperature used after the failure-negative diagnosis in a manner that, when the temperature related to the inverter in any one of the energization systems reaches the second lower-limit temperature, the output correcting unit starts to lower the output limit value for the inverter.

6. The control device for an electric motor according to claim 4, wherein a rate at which the output correcting unit lowers the output limit value for the normally operating inverter in accordance with a rise in the temperature related to the normally operating inverter after the failure-positive diagnosis is lower than a rate at which the output correcting unit lowers the output limit value for the inverter in each of the energization systems in accordance with a rise in the temperature related to the inverter after the failure-negative diagnosis.

7. The control device for an electric motor according to claim 4, wherein the temperature related to the normally operating inverter, at which the output limit value for the normally operating inverter is lowered to 0 after the failure-positive diagnosis, is lower than the temperature related to the inverter in each of the energization systems, at which the output limit value for the inverter is lowered to 0 after the failure-negative diagnosis.

8. The control device for an electric motor according to claim 1, wherein, from when steering operation is performed after the failure-positive diagnosis, the output correcting unit limits the output of the normally operating inverter by lowering the output limit value for the normally operating inverter based on a change in an input electric current or an output electric current of the normally operating inverter or based on an integrated value of the input electric current or the output electric current of the normally operating inverter.

9. The control device for an electric motor according to claim 1, wherein, from when steering operation is performed after the failure-positive diagnosis, the output correcting unit limits the output of the normally operating inverter by lowering the output limit value for the normally operating inverter based on a change or integrated value of an electric-current command for the inverters.

10. The control device for an electric motor according to claim 1, wherein, from when steering operation is performed after the failure-positive diagnosis, the output correcting unit limits the output of the normally operating inverter by lowering the output limit value for the normally operating inverter based on a change or integrated value of a rotation speed of the electric motor.

11. The control device for an electric motor according to claim 1, wherein, from when steering operation is performed after the failure-positive diagnosis, the output correcting unit limits the output of the normally operating inverter by lowering the output limit value for the normally operating inverter based on a change or integrated value of a magnetic pole angle of the electric motor.

12. The control device for an electric motor according to claim 1, wherein, from when steering operation is performed after the failure-positive diagnosis, the output correcting unit limits the output of the normally operating inverter by lowering the output limit value for the normally operating inverter based on a change or integrated value of a steering torque.

13. The control device for an electric motor according to claim 1, wherein, from when steering operation is performed after the failure-positive diagnosis, the output correcting unit limits the output of the normally operating inverter by lowering the output limit value for the normally operating inverter based on a change or integrated value of an angle of a steering wheel.

14. The control device for an electric motor according to claim 1, wherein, from when steering operation is performed after the failure-positive diagnosis, the output correcting unit limits the output of the normally operating inverter by lowering the output limit value for the normally operating inverter based on a change or integrated value of a rotation speed of a steering wheel.

15. A control method for an electric motor which includes a plurality of energization systems each including an inverter and coils corresponding to different phases, and which generates a steering assist force in an electric power steering system, the control method comprising the steps of:
diagnosing whether the inverter in any of the energization systems has failed; lowering an output limit value for the inverter in each of the energization systems in accordance with a rise in a temperature related to the inverter so as to lower a total output limit value for limiting a total output, the total output limit value being the sum of the output limit values for the inverters, the total output being the sum of outputs from the inverters;
when a failure-positive diagnosis is made in which inverters in one or some of the energization systems are diagnosed as having failed, reducing an output of each of failing inverters to a value greater than zero, which are diagnosed as having failed, while raising the output limit value for a normally operating inverter, which is diagnosed as having not failed, so as not to change the total output limit value; and from when steering operation is performed after the failure-positive diagnosis, lowering the raised output limit value for the normally operating inverter in accordance with a rise in the temperature related to the normally operating inverter so as to limit the output of the normally operating inverter.

\* \* \* \* \*